(12) United States Patent
Hollingsworth et al.

(10) Patent No.: US 7,115,706 B2
(45) Date of Patent: Oct. 3, 2006

(54) POLYETHER POLYMERS AND COMPOSITIONS DERIVED THEREFROM

(75) Inventors: Rawle I. Hollingsworth, Haslett, MI (US); Yuqing Chen, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 61 days.

(21) Appl. No.: 10/802,635

(22) Filed: Mar. 17, 2004

(65) Prior Publication Data

US 2005/0209430 A1    Sep. 22, 2005

(51) Int. Cl.
*C08G 65/34*    (2006.01)
(52) U.S. Cl. ............... 528/425; 528/463; 528/370; 528/86; 528/405; 528/488; 430/637
(58) Field of Classification Search ............... 528/425, 528/403, 370, 86, 405, 488; 430/637
See application file for complete search history.

(56) References Cited

U.S. PATENT DOCUMENTS 4,637,939 A * 1/1987 Maruno et al. ............. 427/162

FOREIGN PATENT DOCUMENTS

| AP | 84-80134 | | 4/1984 |
|----|----------|---|--------|
| JP | 60224680 | A2 | 11/1985 |
| JP | 61151044 | * | 7/1986 |

OTHER PUBLICATIONS

Sowada, U., et al., J. Phys. Chem. 84 1150-1154 (1980).
Niyikos, L., et al., J. Phys. Chem. 84 1154-1155 (1980).
Shchegoleva, L. N., et al., chemical physics Letters 312 325-332 (1999).
Beregovaya, I. V., et al., International Journal of Quantum Chemistry 88 481-488 (2002).
Stass, D.V., et al., chemical physics Letters 243 533-539 (1995).
Oomori, T., et al., Chemical Physics 178 477-481 (1993).
Faidas, H., et al., Chemical Physics Letters 193 487-492 (1992).
Gant, K.S., et al., The Journal of chemical Physics 65, 2977-2981 (1976).
Matsuura, H., et al., Mol Struct 126, 251 (1985).
Bjorling, M., et al., J. Phys. Chem. 95, 6706-6709 (1991).
Bruzga, P., et al., Eur. Polym. J. 27 707-711 (1991).
Toneri, T., et al., Macromolecules 32 1293-1296 (1999).
Aida, T., et al., Macromolrcules 21 1195-1202 (1988).
Yasuda, T., et al., Bull. Chem. Soc. Jpn. 59 3931-3934 (1986).
Takuma, K., et al., Marcomolrcules 26 862-863 (1993).
Price, Charles C., et al., J. Amer. Chem. Soc. 3972-3975 (1972).

* cited by examiner

*Primary Examiner*—Duc Truong
(74) *Attorney, Agent, or Firm*—Ian C. McLeod

(57) ABSTRACT

Polyether polymers providing a backbone substituted at intervals with electron stabilizing groups containing electron withdrawing groups are described. The polymers capture electrons and are electronegative. The polymers act to solvate alkali metals so that electrons are withdrawn from the alkali metal into the polymer. The polymer compositions are conductive under certain conditions and are magnetic. The compositions are useful in electronic applications.

17 Claims, 34 Drawing Sheets

POLYETHER POLYMERS AND COMPOSITIONS DERIVED THEREFROM

CROSS REFERENCE TO RELATED APPLICATIONS

None

GOVERNMENT RIGHTS

None

BACKGROUND OF THE INVENTION (1) Field of the Invention

The present invention relates to novel polyether polymers which are particularly useful for solvation of electrons. The polymer can be treated with alkali metals so that electrons are disassociated from the alkali metal into the structure of the polymer. Electrons can be introduced by photolysis, electrochemically from an electride or alkalide or from a radio-isotrope among other means. Electron withdrawing group attached along the backbone of the polyether polymer attract the electrons from the alkali metal or other source.

(2) Description of Related Art

There are tremendous practical limitations on use of crystalline substances as key structural elements in technology. Unfortunately, magnetic materials are invariably crystalline and therefore not easily processed. Polymers represent an important format for the preparation of substances for general utility applications and are easily the most widespread in use of all man-made materials. The methods used to process them are many and allow the production of a myriad of formats including films, sheets, blocks, wires, coatings, pellets, laminates, colloids, nano-systems and fibers. In addition, solutions of polymers or polymer melts can be used for patterning of surfaces using stenciling, lithographic, electrostatic, magnetostatic, laser printing or jet printing technologies. The ability to produce advanced materials in such formats has driven technology. Success in the development of a general class of stable polymeric organic substances with special optical, electronic or magnetic properties that could be processed by such methods would represent a significant advance in material science.

Much theoretical and practical research has been performed on the energetics of electron captured by hexafluorobenzene and on the structure and properties of the resulting radical anion species (Sowada, U., et al., *J. Phys. Chem.* 84 1150–1154 (1980); Nyikos, L., et al., *J. Phys. Chem.* 84 1154–1155 (1980); van den Ende, C., et al., *Radiat. Phys. Chem.* 19 297–308 (1982); Shchegoleva, L. N., et al., *chemical physics Letters* 312 325–332 (1999); Beregovaya, I. V., et al., *International Journal of Quantum Chemistry* 88 481–488 (2002); Stass, D. V., et al., *chemical physics Letters* 243 533–539 (1995); Oomori, T., et al., *Chemical Physics* 178 477–481 (1993); Faidas, H., et al., *Chemical Physics Letters* 193 487–492 (1992); and Gant, K. S., et al., *The Journal of chemical Physics* 65, 2977–2981 (1976)). Hexafluorobenzene has a very high cross section for electron capture. The energy required to bounce the electron back out of the radical anion has been estimated at 0.5 to 0.8 eV based on theoretical analyses (Faidas, H., et al., *Chemical Physics Letters* 193 487–492 (1992)). Consistent with this, the wavelength of light required to cause the photo-dissociation of the radical anion to a free election and Hexafluorobenzene in the gas phase by laser induced separation has been found experimentally to be ~450 nm (2.75 eV) (Sowada, U., et al., *J. Phys. Chem.* 84 1150–1154 (1980)). This is in the green area of the visible region of the electromagnetic spectrum. In one such study, (Faidas, H., et al., *Chemical Physics Letters* 193 487–492 (1992)) it was demonstrated that a laser pulse to the radical anion in the gas phase at this wavelength in the presence of an electric potential triggered dissociation and a current pulse that fell to zero within 1 nano second of the end of the laser pulse. The wavelength at which this photodissociation process takes place has special practical significance. If it occurred at lower wavelength (blue or UV) the cost availability of lasers that operate in these areas would be a limitation. If the wavelength were in the red or near IR region then the electron would be so loosely held that the system would be extremely reactive and chemically unstable at room temperature and would reduce most things it came in contact with.

Electride and alkalide compounds are well known to those skilled in the art. Such compounds are highly unstable at room temperatures. The alkalides and electrides are able to react with metal salts to form metals.

Polyether polymers are well known to those skilled in the prior art. The types of polyether polymers disclosed herein are not known to the prior art.

OBJECTS

It is therefore an object of the present invention to provide novel polyether polymers with electron stabilizing side chains.

It is further an object to provide novel polyether and alkali metal compositions wherein the electrons of the alkali metal are disassociated from the metal into the electron stabilizing side chains of the polyether polymer. These and other objects will become increasingly apparent from the following description and the drawings.

SUMMARY OF INVENTION

The present invention relates to a polyether polymer which comprises:

(a) a backbone of the polyether polymer having repeating chain units of the backbone, wherein preferably the backbone is a polyglycidyl, or a glycol ether; or any related polymer containing a high number of ether linkages;

(b) electron stabilizing side chains attached at a carbon along the length of the backbone of the polyether polymer, the electron stabilizing side chains comprising an aromatic group covalently attached to the backbone of the polymer and one or more electron withdrawing groups covalently attached to the aromatic group. Preferably the polymer contains stable free electrons on the electron withdrawing groups so that the polymer is electronegative. The term "glycol" means any organic compound with an α,β-dihydroxyethylene group. Preferably the organic compound is an alkylene glycol wherein alkylene ($CH_2$) contains between 1 and 20 carbon atoms. The term "glycidyl" means any organic compound with an α,β-epoxy ethylene group. Preferably the organic compound is an alkylene glycidyl compound wherein alkylene contains between 1 and 20 carbon atoms. Preferably the one or more electron withdrawing groups are selected from the group consisting of cyano, fluoro, nitro, acyloxy, carboxyalkyl, carboxyaryl, formyl, thiocarbonyl, sulfonyl, alkylsulfoxy (RSO), arylsulfoxy, alkylsulfodioxy, and arylsulfodioxy. Preferably the electron stabilizing side chains occur at an average interval of one electron stabilizing side chain per ten chain units of the backbone to one electron stabilizing side chain per one chain unit of the backbone. Preferably the electron stabilizing side chains occur at more than an average interval of one electron stabilizing side chain per six chain units of the backbone.

Preferably the backbone of the polymer is a poly(glycidyl ether). Also preferably the backbone of the polymer is predominantly a poly(glycol ether).

Preferably the electron stabilizing side chains are fluorophenoxy groups containing 1 to 5 fluoro atoms. Also the electron stabilizing side chains are preferably dinitrophenoxymethyl groups. Also the electron stabilizing side chains are preferably dicyanophenoxymethyl groups. Also the electron stabilizing side chains are preferably pentafluoromethoxy methyl groups. Also the electron stabilizing side chains are preferably dinitrophenoxy methyl groups.

Preferably the backbone of the polymer is a poly(pentaethylene glycol). Preferably the electron stabilizing side chains are fluorobenzyloxymethyl groups containing 1 to 5 fluoro atoms. Preferably the electron stabilizing side chains are dinitrobenzyloxymethyl groups. Preferably the electron stabilizing side chains are dicyanobenzyloxy methyl groups. The present invention also relates to glycidyl pentafluorophenyl ether. Further the present invention relates to (2,2-dimethyl-1,3-dioxolone-4-methanol)pentafluorophenyl ether.

The present invention relates to a process for the preparation of a polyether polymer which comprises:

(a) providing an epoxy compound of the formula

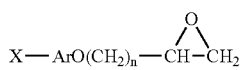

wherein X is one or more electron withdrawing groups, Ar is an aromatic group, and n is between one and 20; and (b) polymerizing the epoxy compound to prepare the polyether polymer. Preferably X—ArO⁻ is pentafluoroxy.

The present invention also relates to a process for the preparation of a polyether polymer which comprises:

(a) providing a compound of the formula

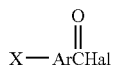

wherein X is one or more electron withdrawing groups, Ar is an aromatic group, Hal is a halogen; and (b) reacting the compound with a hydroxylated polyether to form the polyether polymer. Preferably

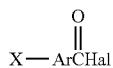

is of the formula:

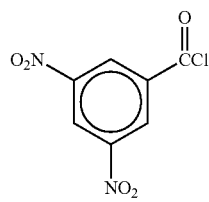

The present invention relates to a process for the preparation of a polyether polymer which comprises reacting a leaving group protected ether monomer, such as a dihalo or diaryl or alkylsulfonate monomer with a dihydroxy compound of the formula

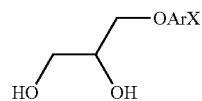

to produce the polyether polymer, wherein Ar is an aromatic group and X is an electron withdrawing group.

Preferably the dihydroxy compound is

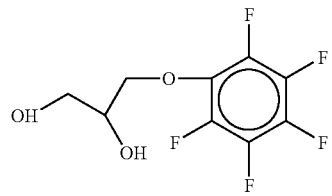

The present invention relates to a composition which comprises:

(a) a polyether polymer which comprises:
a backbone of the polyether polymer having repeating chain units wherein the backbone is a polyglycidyl or a glycol ether,
electron stabilizing side chains attached at a carbon along the length of the backbone of the polyether polymer, the electron stabilizing side chains comprising an aromatic group covalently attached to the backbone of the polymer and one or more electron withdrawing groups covalently attached to the aromatic group; and
(b) an alkali metal contained in the polyether polymer so that electrons from the alkali metal are withdrawn into the polymer by the electron stabilizing side chains. Preferably the one or more electron withdrawing groups are selected from at least one member of the group consisting of cyano, fluoro, nitro, acyloxy, carboxyalkyl, carboxyaryl, formyl, thiocarbonyl, sulfonyl, alkylsulfoxy (RSO), arylsulfoxy, alkylsulfodioxy, and arylsulfodioxy as discussed above.

The present invention relates to a process for producing an alkali metal-polyether composition which comprises:

(a) providing a polyether polymer which comprises a backbone of the polymer having repeating chain units preferably wherein the backbone is a polyglycidyl or a glycol ether, and an electron stabilizing side chains linked at a carbon along the length of the backbone of the polymer, the electron stabilizing side chains comprising aromatic groups covalently attached to the backbone of the polymer and one or more electron withdrawing groups covalently attached to the aromatic groups;

(b) reacting the polyether polymer with an alkali metal in a non-reactive atmosphere; and (c) separating an alkali metal-polyether composition from the reaction mixture.

Preferably the reaction is conducted in the presence of a non-reactive solvent for the polyether polymer.

The present invention also relates to a process for producing an electronegative polyether polymer composition which comprises:

(a) providing a polyether polymer which comprises a backbone of the polymer having repeating chain units wherein the backbone is a polyglycidyl or a glycol ether, and an electron stabilizing side chains attached at a carbon along the length of the backbone of the polymer, the electron stabilizing side chains comprising aromatic groups covalently attached to the backbone of the polymer and one or more electron withdrawing groups covalently attached to the aromatic groups; and (b) reacting the polyether polymer with an electron source so that the electrons remain on the electron withdrawing groups and the polymer is electronegative.

The preferred Poly(glycidyl pentafluorophenyl ether), a polyethylene oxide type material containing a pentafluorophenoxymethyl substituent on each ethylene fragment, was prepared and used as a matrix for the dissociative solvation of the alkaline metals potassium and sodium. Systems in which the metal cations are stabilized by the polyether system and the electrons are captured by the pentafluorophenyl group to form highly colored (pink to violet) anionic bands were formed. Condensed phase systems containing high densities of aromatic radical anions forming delocalized electronic bands hold special promise. Depending on the clustering of energy states, can behave as semiconductors under some temperatures regimes. They can behave as superconductors in other temperature domains. Such materials might have useful photochromic or electrochromic or other optical-electronic properties. The optical, magnetic and electronic properties of the systems were examined by UV-visible spectroscopy, variable temperature electron paramagnetic resonance (EPR) spectroscopy and magnetometry using a superconducting quantum interference device (SQUID). The new materials are antiferromagnetic with some paramagnetic domains. The displayed highly asymmetric (Dysonian) EPR first derivative curves in the temperature range of 4–80 K indicating the presence of very highly conductive states in these regimes. Unlike the alkalide and electride systems described by the prior art, the new systems are stable for several months at room temperature and do not ignite spontaneously in air. Such stability is not known in alkali metal/organic systems. This greatly increases the potential for use of the materials described here in electronic device fabrication.

BRIEF DESCRIPTION OF THE DRAWINGS

FIG. 32A is a graph of the field dependence of magnetization at specific temperatures. FIG. 32B is a graph of the temperature dependence of mass susceptibility at specific fields.

FIG. 33A is a graph of the field dependence of magnetization at specific temperatures. FIG. 33B is a graph of the temperature dependence of mass susceptibility at specific fields.

FIG. 34A is a graph of the field dependence of magnetization at specific temperatures. FIG. 34B is a graph of the temperature dependence of mass susceptibility at specific fields.

FIG. 35A is a graph of the field dependence of magnetization at specific temperatures. FIG. 35B is a graph of the temperature dependence of mass susceptibility at specific fields.

DESCRIPTION OF PREFERRED EMBODIMENTS

All patents, patent applications, government publications, government regulations, and literature references cited in this specification are hereby incorporated herein by reference in their entirety. In case of conflict, the present description, including definitions, will control. Definitions for the following terms are provided to promote a further understanding of the present invention.

The terms "chain unit" or "unit" refers to the monomer unit repeated to form the polymer. The term "covalently attached" in general means a covalent bond between moieties.

Structure of the Doped Poly(glycidyl pentafluorophenyl ether)

A polymer matrix containing high densities of polyfluorinated aromatic groups and very high binding capacity for metal cations was prepared. A polyether was used as the central element with the fluorinated aromatic groups attached or linked as side chains. Charge-separated species were formed by the dissolution or dispersion of alkali metals in the matrix. The alkali cation complexes with the oxygen functions of the polyether and the electrons are captured by the fluorinated groups and exist within some band structure or as a more localized radical anion. The polymers are much more stable than alkalides (systems in which the electron is captured by a neutral metal atom to form a metal anion) because the electron affinity of hexafluorobenzene (0.5–0.8 eV) is much greater than that of an alkali metal atom (~0.3 eV) (see FIG. 1).

Figure 2:
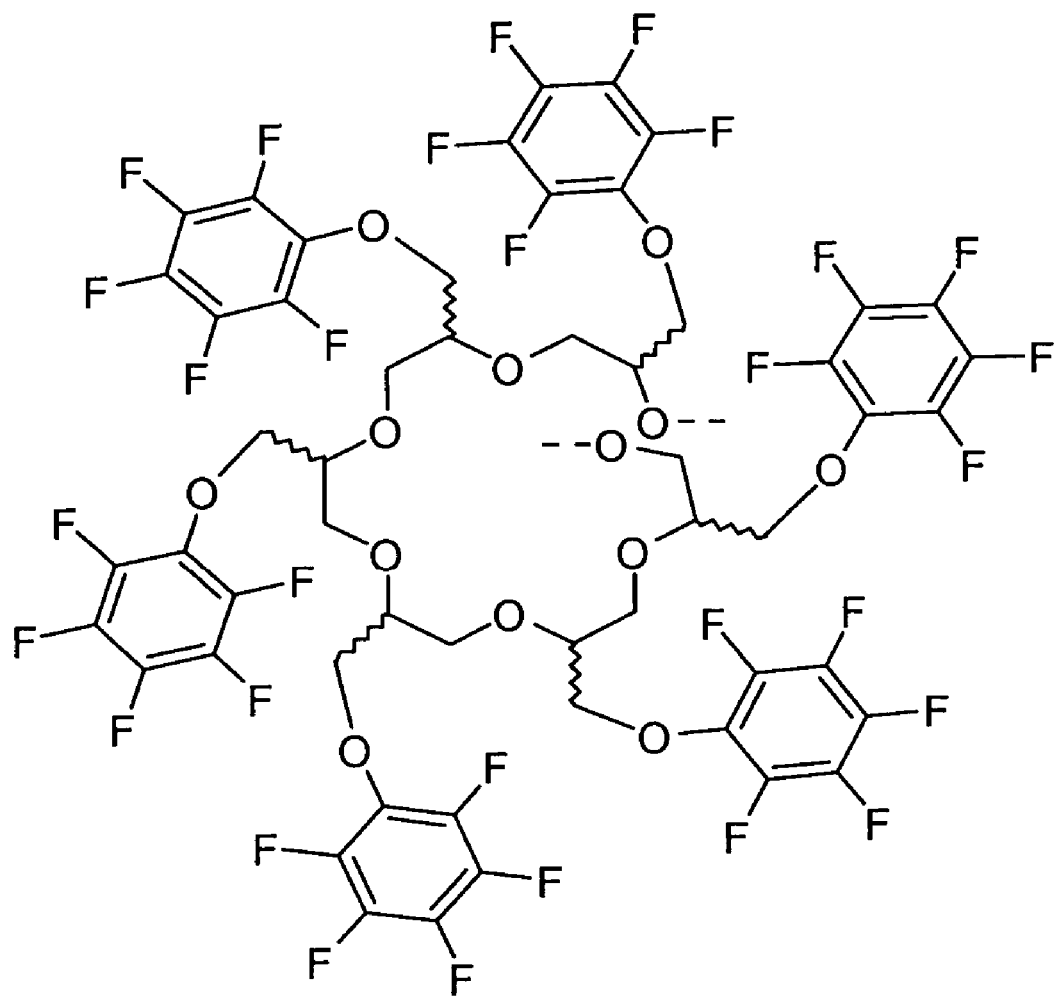
FIG. 2 is a unit of a chemical structure of a preferred polymer 1 (poly-(glycidylpentafluorophenyl ether) wherein units repeat at the dotted lines.
Figure 3A:
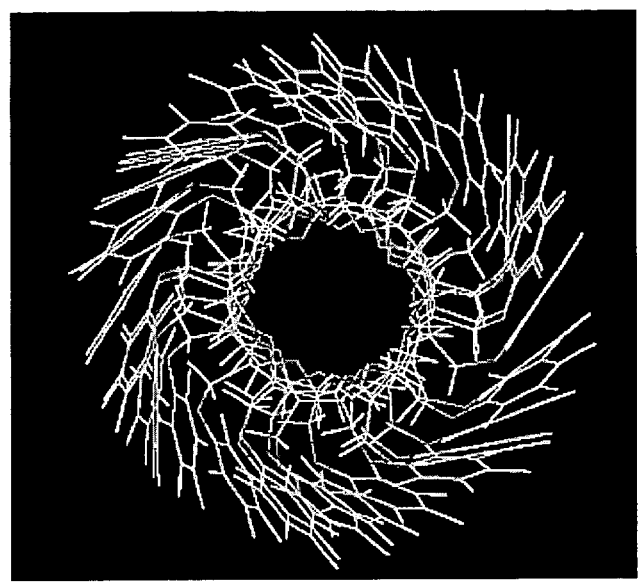
FIG. 3A shows a plan view down a helical segment of polymer 1 showing the cavity in which metal ions reside and the surrounding whorl of pentafluorophenyl groups in which the liberated electron is localized as radical anions or as itinerant electrons.
Figure 3B:
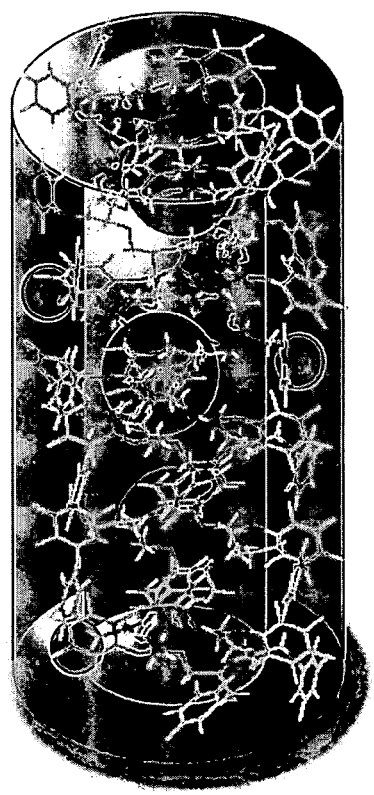
FIG. 3B is a perspective view along the length of a helical segment of polymer 1 shown in FIG. 3A showing the inner cavity (channel) in which the metal ions reside and the outer sheath in which the electrons are localized.

The polymer having repeating units shown in FIG. 2 was synthesized. The synthetic strategy is shown in Scheme 1 hereinafter. The rationale behind the architecture was that the poly-ethylene oxide backbone can form a helical structure with the oxygen atoms facing inwards to bind to the metal ions very much as in a crown ether; The pendant pentafluorophenoxymethyl groups then form an outer whorl around the polyether core (FIG. 3A). The major form of this arrangement is a central cylindrical channel along which the metal ions move surrounded by an outer sheath containing pentafluorophenyl groups and interacting electrons (FIG. 3B).

The structure is an ideal one. Poly(ethylene oxide) really does not exist in a helical conformation to a major extent except in the crystalline state (Matsuura, H., et al., *Mol Struct.* 126, 251 (1985)). In the presence of alkali metal cations however, the percentage of gauche conformers about the C—C bond for the dialkoxyethane units (characteristic of the helical structure) increases significantly (Bjorling, M., et al., *J. Phys. Chem.* 95, 6706–6709 (1991)). This interaction is the essential driving force that promotes metal ion templated crown ether formation. A crown ether molecule complexed with a metal ion has all gauche conformations about the C—C bonds. In the present invention, regions of transient helicity initiated and stabilized by the alkali metal cation along a significantly less ordered backbone is formed.

Figure 30A:
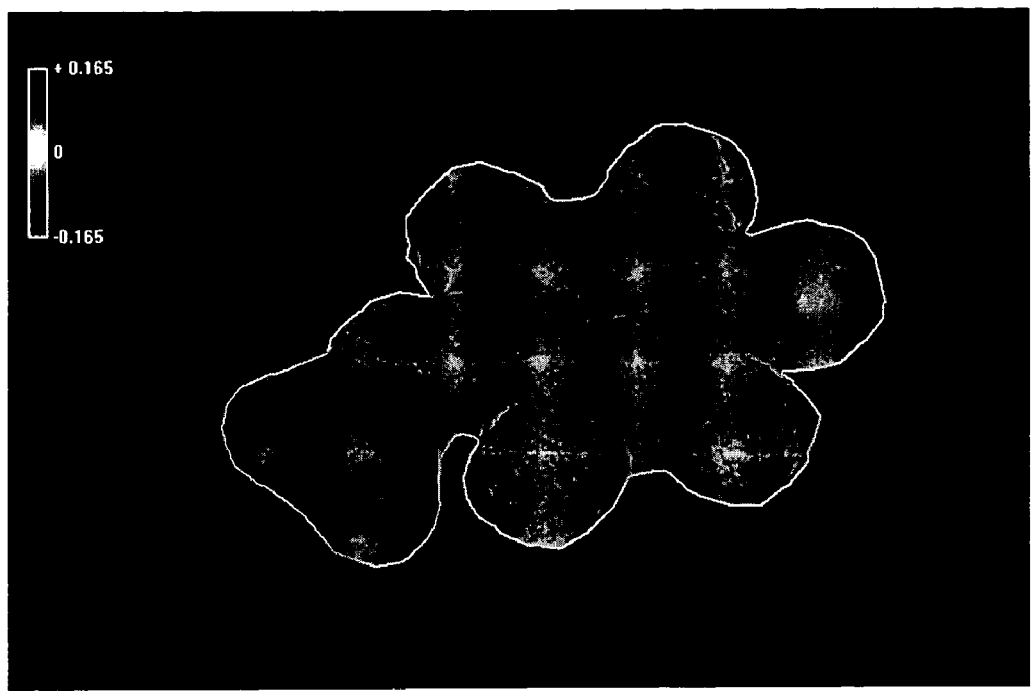
FIG. 30A illustrates a molecular electrostatic potential surface for methyl pentafluorophenyl ether.
Figure 30B:
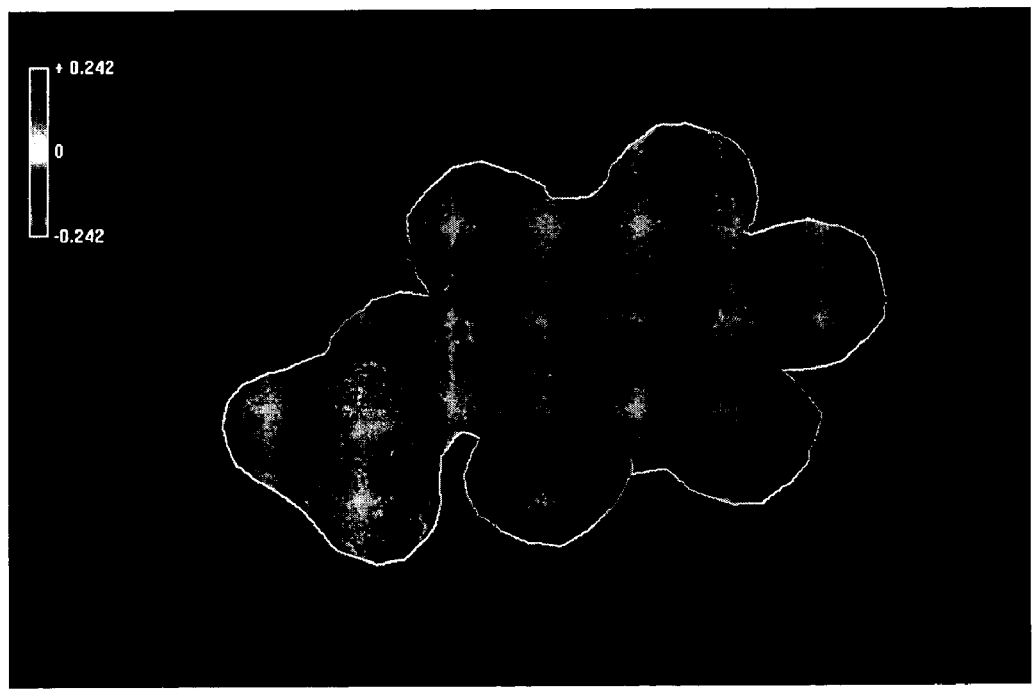
FIG. 30B illustrates a molecular electrostatic potential surface for methylpentafluorophenyl ether radical anion calculated using PM3 semiempirical method.

One of the first steps was to provide an alkoxypentafluorobenzene radical anion which had comparable stability to a hexafluorobenzene radical anion. The presence of an alkoxy substituent on the benzene ring increased the electron density in the ring by the mesomeric effect thus making the capture of the electron less favorable. The presence of five fluorine substituents had a profound effect in stabilizing a captured electron. Estimates of heat of formation of radical anions of hexafluorobenzene and methoxypentafluorobenzene using AM1 calculations gave a decrease in stability of only 24% on replacement of a fluorine atom by a methoxy group. The result was unexpectedly that there was a tremendous stabilization of the captured election by the remaining five fluorine atoms. The molecular electrostatic potential surface of the radical anion and the neutral form of methoxypentafluorobenzene (FIGS. 30A and 30B) demonstrate the ability of the fluorine atoms to spread the charge over the ring.

Figure 1:
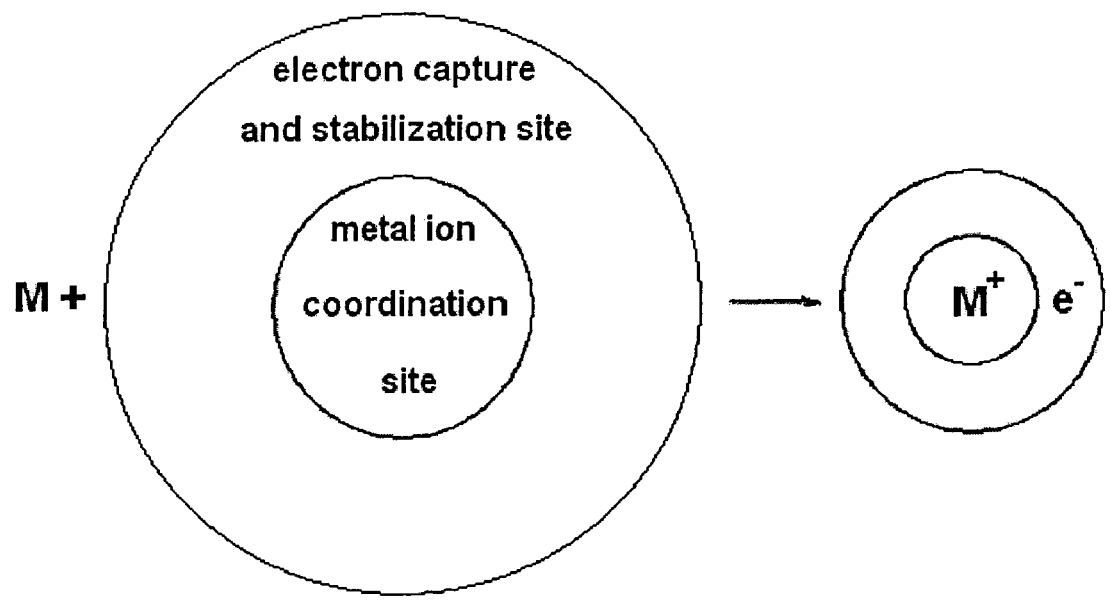
FIG. 1 is a schematic view showing the result of reactive metal such as sodium, potassium or lithium captured by a polymer so that the metal and its electrons are separated in a polymer.

A general architecture for preparing new polymer-based advanced materials is illustrated in FIG. 1. In this new architecture, a system capable of binding the metal ion in a cavity that is surrounded with a chemical functionality that can stabilize an electron is provided. Because of the high reactivity of free electrons, linkages and functional groups such as ester, amide, ketone, sulfoxide etc cannot be present. Ether linkages, on the other hand, are quite ideal if the electrons are low enough in energy. Stabilizing groups such as pentafluorophenyl or dinitrobenzoyl are preferred for capturing (withdrawing) and stabilizing electrons.

Figure 3C:
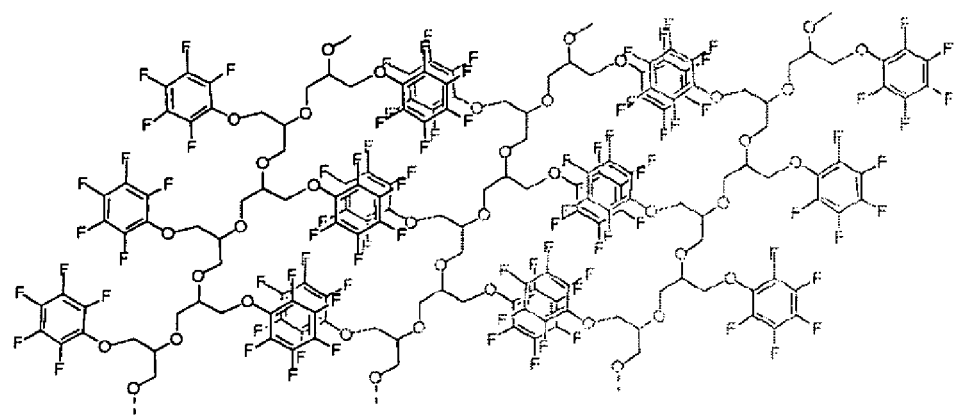
FIG. 3C is a perspective view of an alternative packing arrangement of polymer 1 in which the polyether chain is extended and parallel strands interact through the pentafluorophenyl groups. Layering of these systems can give rise to an architecture in which the metal ions are sandwiched between polyether channels and the electrons reside in the stacked pentafluorophenyl chains.
Figure 4:
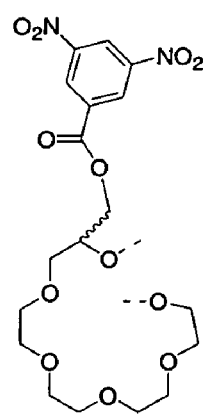
FIG. 4 is a chemical structure of polymer 2 (Poly(1-(3, 5-dinitro)benzyloxymethyl pentaethylene glycol), wherein the units repeat in the polymer at the dashed lines.
Figure 5:
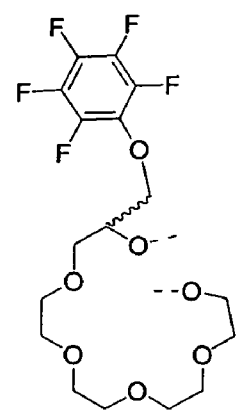
FIG. 5 is a chemical structure of polymer 3 (Poly(1-(pentafluorophenoxy-methyl)pentaethylene glycol), wherein the units repeat in the polymer at the dashed lines.

Polyether organic systems that dissociatively solvate metals where the metal cations are stabilized by oxygen atoms and the electrons are captured by groups with high electron affinity were prepared. Three polymer systems were developed in which the metallated systems were designed to contain high densities of aromatic groups forming delocalized electronic bands. These have potential for a variety of practical and theoretical reasons. Depending on the clustering of energy states, the systems can behave as semiconductors under some temperature regimes. They can behave as superconductors in other temperature domains. Such materials have useful photochromic or electrochromic or other optical-electronic properties. The optical, magnetic and electronic properties of the systems were examined by UV-visible spectroscopy, variable temperature electron paramagnetic resonance (EPR) spectroscopy and magnetometry using a superconducting quantum interference device (SQUID). The first stem (FIG. 2) had the highest density of electron capture groups in the form of pentafluorophenyl functions. The polyether formed a helical channel surrounded by a whorl of pentafluorophenyl groups (FIGS. 3A and 3B). Parallel arrangements can also be prepared (FIG. 3C). There are random, partially ordered or glassy phases giving rise to a rich spectrum of magnetic phenomena. The other two polymers had only one electron capture group per 5 ethylene bridges. In the case of polymer 2 this was a 3,5-dinitrobenzoyl group (FIG. 4) and in the case of polymer 3 a pentafluorophenyl group (FIG. 5).

The new polymers have a spectrum of magnetic properties when doped with alkali metals. Doped polymer 1 was antiferromagnetic with some ferrimagnetic and paramagnetic domains. The EPR spectrum displayed highly asymmetric (Dysonian) first derivative curves in the temperature range of 4–80 K indicating the presence of very highly conductive states in these regimes. There were significant differences in the optical, magnetic and electronic properties of polymer 1 depending on the molecular weight used. The level of doping and the metal can be used to control the properties. Polymer 2 displayed very complex behavior on varying either the field or temperature and polymer 3 was largely paramagnetic in character. The high antiferromagnetic character and indeed the ferrimagnetic character in some temperature regimes of polymer 1 indicate a very high level of ordering in regions of the material. Helical and layered structures can be obtained. Ordering is important for applications involving varying of functional groups. Temperature or field can be used to effect transitions between different magnetic states. This is of significant practical value.

Magnetization measurements in the low temperature regime of all polymers showed sudden drops with increasing temperature and oscillations of the type characteristic of spin glasses. Such states are well known for solutions of metals in metals and indicate a state of disorder with a resultant net magnetization. Polymeric organic systems that are capable of spin glass formation are rare or unknown. The dynamic nature of the magnetic state opens up several applications because high lattice order is not required. Examples include the manipulation of spin.

Unlike the alkalide and electride systems described before, the new systems are stable from several days to several months at room temperature and do not ignite spontaneously in air. Such stability is not known in previous alkali metal/organic systems. This greatly increases the potential for use of the materials described here in device fabrication. The materials generally dissolved readily in tetrahydrofuran to form solutions that varied in color from pink through violet.

The electro-optical properties of these materials in general have special potential. In one case, the red color (complementary to the green absorption maximum) in radical anions can be discharged on irradiation and can be quickly re-established on recombination. The application of an electric field that is significantly below the work function of the material in a localized area can alter the energy of the radical anion and hence the color or magnetic properties. It is possible to capture free electrons from sources such as low energy β-emitters. Radioactive sources such as tritium, C-14 or 35-S can be suitable. The ability to capture free electrons is a desirable feature of materials used as high voltage insulators especially in thin film applications. Other potential applications include sensors, corrosion protection coatings, capacitors, transistors, LEDs, micro-actuators electrochromic displays, batteries and energy storage devices, photoelectrodes and a spectrumn of other applications.

The following Examples and Schemes 1, 2 and 3 show the preparation of polymers 1, 2 and 3.

In reference to Example 1 the following is a discussion of the Preparation of Glycidyl Pentafluorophenyl Ether.

Glycidyl pentafluorophenyl ether is useful as thinners, especially for epoxy resins. It has been prepared by the epoxidation of the corresponding olefin. The epoxidation of olefins is one of the most important synthetic manipulations due to the broad range of chemistry available to further derivatize epoxides. The most general reagents for conversion of simple alkenes to epoxides are peroxycarboxylic acids. m-Chloroperbenzoic acid (mCPBA) is a particularly convenient reagent, it has an electrophilic oxygen that reacts with the π system of the alkene. Addition of oxygen occurs preferentially from the less hindered side of the molecule. It has been demonstrated that ionic intermediates are not involved in the epoxidation reaction. The oxidation is believed to be a concerted process. A representation of the transition state is shown below.

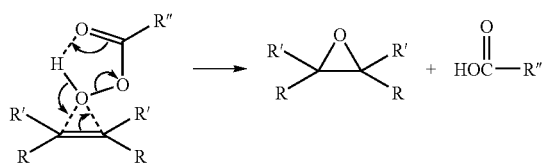

Glycidyl pentafluorophenyl ether can also be prepared by the condensation of pentafluorophenyl and epichlorohydrin (Maryno, T., et al., Patent No.: JP 60224680 A2 19851109 Showa. Application No.: JP 84-80134 19840423 (1985)). These two compounds were refluxed at 80° C. in the presence of acetone and H$_2$O and further refluxed with addition of NaOH to give 84.6% glycidyl pentafluorophenyl ether.

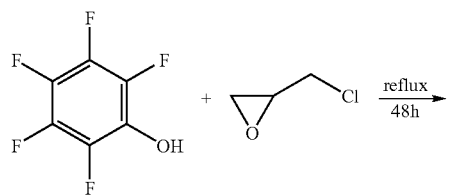

The following is a discussion of the Polymerization of Glycidyl Pentafluorophenyl Ether as in Example 1.

Epoxides, like cyclopropanes, are strained due to the constraints imposed by bonding three tetrahedral atoms into a three-membered ring. As a consequence of this ring strain, epoxides undergo ring-opening reactions with nucleophiles via $S_N1$ and $S_N2$ mechanisms.

The polymer of glycidyl pentafluorophenyl ether was prepared in the presence of a catalyst by cationic or anionic mechanism (Bruzga, P., et al., Eur. Polym. J. 27 707–711 (1991); Toneri, T., et al., Macromolecules 32 1293–1296 (1999); Aida, T., et al., Macromolrcules 21 1195–1202 (1988); Yasuda, T., et al., Bull. Chem. Soc. Jpn. 59 3931–3934 (1986); Takuma, K., et al., Macromolrcules 26 862–863 (1993); and Price, Charles C., et al., J. Amer. Chem. Soc. 3972–3975 (1972)). The polymerization was investigated in several different conditions, as shown in Table 1. Poly(glycidyl pentafluorophenyl ether) with the highest molecule weight was obtained in dichloromethane at room temperature by using SbCl$_5$ as the catalyst. For cationic polymerization of epoxides, the following Lewis acids can be used as catalysts: stannic chloride (SnCl$_4$), stannic bromide (SnBr$_4$), stannic iodide (SnI$_4$) and antimony (V) chloride (SbCl$_5$). According to literature, the highest catalytic activity was shown by SbCl$_5$ but that of SnCl$_4$ was only slightly lower. The higher catalytic activity of SbCl$_5$ relative to that of SnCl$_4$ may be explained by the higher electrophilicity of the antimonium ion.

Like the polymerization of many epoxy monomers with Lewis acids, instantaneous initiation and rapid decrease of polymerization rate is characteristic of this system. Conversion of glycidyl pentafluorophenyl ether was estimated by $^1$H-NMR spectrum of the crude polymerization mixture. Very high initial rate and prompt quenching of polymerization was observed. The MW of the polymer obtained was investigated by GPC. It was found that the MW increased as the initial catalyst concentration increased, but when the concentration of SbCl$_5$ exceeds 0.02 mol/l, no apparent MW increase was observed.

TABLE 1

Polymerization of glycidyl pentafluorophenyl ether with antimony (V) chloride or potassium t-butoxide

| catalyst | solvent | temp (° C.) | MW[a] |
|---|---|---|---|
| 0.02 mol/l SbCl$_5$ | CH$_2$Cl$_2$ | 25 | 10000–50000 |
| 0.02 mol/l SbCl$_5$ | CH$_2$ClCH$_2$Cl | 60 | <2000 |
| 1% (CH$_3$)$_3$COK | DMSO | 110 | <2000 |

[a]Estimated by GPC based on polystyrene standards.

Scheme 1. Preparation of polymer 1. Reagents and conditions: (a) NaH, THF, 25° C., 6h, 100% (crude); (b) mCPBA, CH$_2$Cl$_2$, 25° C., 12h, 85% (crude); (c) SbCl$_5$, Ch$_2$Cl$_2$, 25° C.

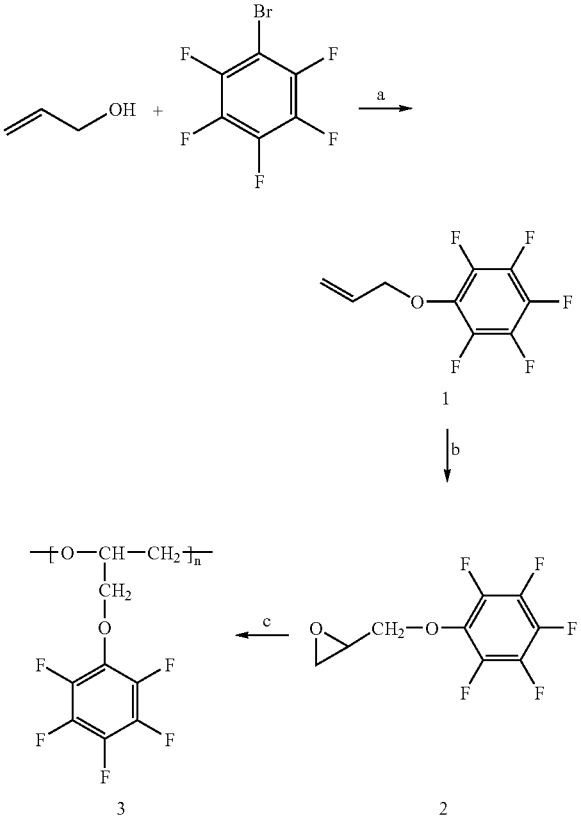

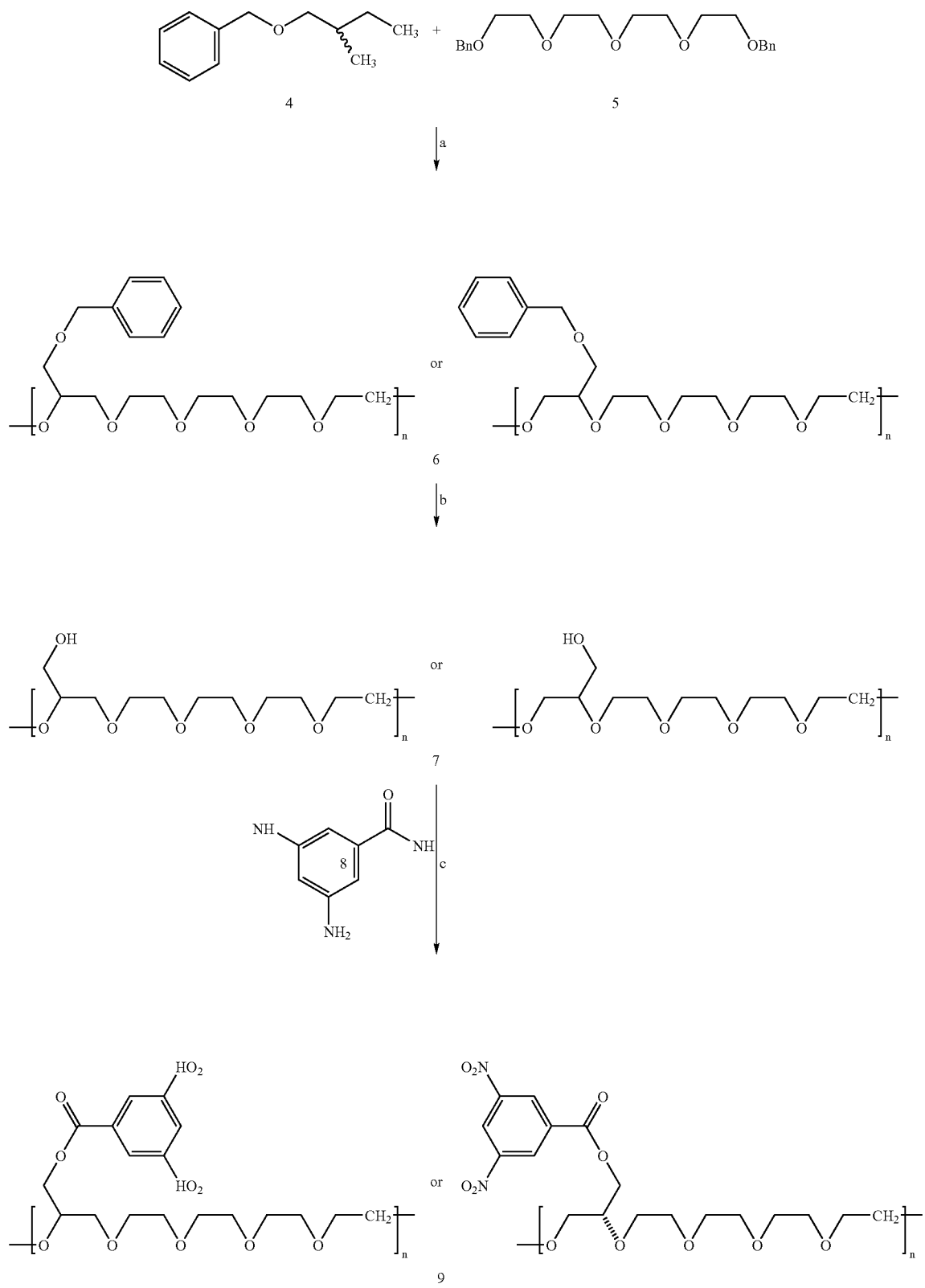
Scheme 2. Preparation of polymer 2. Reagents and conditions: (a) NaH, THF, reflux (80° c.), 24h; (b) hydrogen, 10% Pd-C, ethanol, 25° C., 48h, 95%; (c) pyridine, 25° C., 24h.

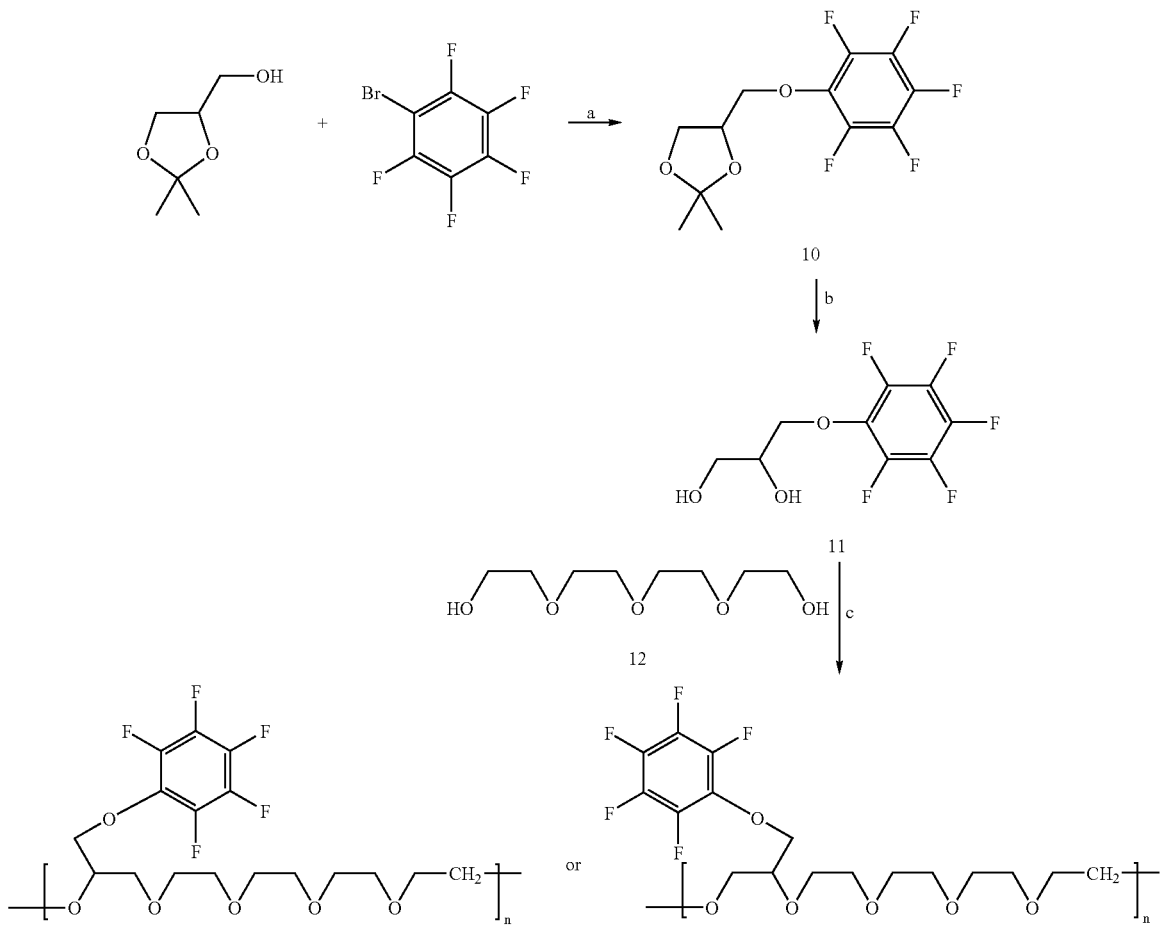

Preparation of polymer 3. Reagents and conditions: (a) NaH, THF, 0° C.–r.t., 12 h; (b) HCOOH, HCl, ethanol, reflux (80° C.), 24 h; (c) NaH, THF, reflux (70° C.), 24 h.

EXAMPLE 1

Preparation of Polymer 1.

(a). Preparation of allyl pentafluorophenyl ether: Allyl alcohol was reacted with bromopentafluorobenzene in the presence of sodium hydride to give compound 1. Firstly, sodium hydride (5.1 grams of a 60% dispersion in mineral oil) was washed with 200 ml hexane. After decanting the hexane, tetrahydrofuran (500 ml) was added to the flask which was equipped with a drying tube. The stirrer was started and the temperature was kept at 25° C. Allyl alcohol (29.0 g) was added to the sodium hydride solution very slowly to avoid excessive foaming and heat production. Bromopentafluorobenzene (24.7 g) was then added dropwise. The reaction was checked by TLC. After 18 hours ethanol (5 ml) is added to decompose excess sodium hydride and the THF and excess allyl alcohol were removed. Dichloromethane (500 ml) and water (100 ml) was added to the reaction mixture. The organic layer was recovered and washed thoroughly with water to remove sodium bromide. It was then dried with anhydrous sodium sulfate and stripped of solvent. The yield of the crude product was 24.9 g. The crude product was purified by flash column chromatography on silica using hexane and dichloromethane/hexane (1:5) as the eluant.

(b). Preparation of glycidyl pentafluorophenyl ether: The epoxidation of compound 1 (24 g) was performed by treatment with 70 ml of 20% solution of m-chloroperbenzoic acid (mCPBA) in methylene chloride. The temperature was kept at 25° C. by cooling during addition of the mCPBA solution over a 10 min period. After 48 hours 200 ml of 10% sodium sulfite was added to destroy excess peracid until a test with starch-iodide paper was negative. The reaction mixture was then transferred to a separatory funnel and the organic layer was washed with 200 ml 5% sodium bicarbonate solution to extract the m-chlorobenzoic acid, followed by washing with water and finally with saturated sodium chloride solution. The organic layer was then dried with anhydrous sodium sulfate and stripped of $CH_2Cl_2$. The crude product was purified by column chromatography on silica with 1:1 $CH_2Cl_2$/hexanes. The product was then purified by vacuum distillation. The pure product glycidyl pentafluorophenyl ether was obtained as a viscous pale yellow liquid.

(c). Preparation of poly(glycidyl pentafluorophenyl ether) (polymer 1)

Figure 20:
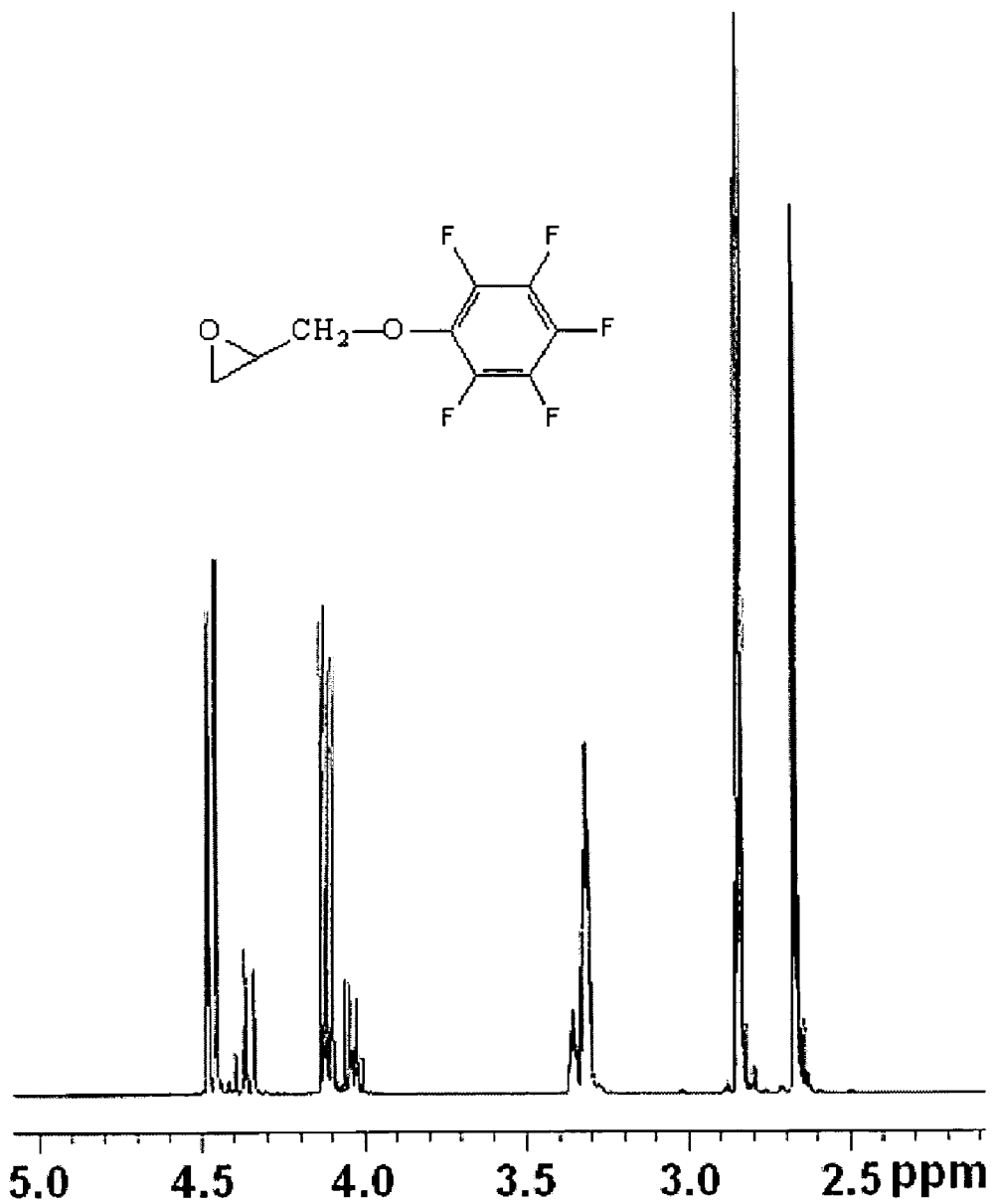
FIG. 20 is a graph showing 300 proton MHz NMR spectrum of glycidyl pentafluoro-phenyl ether in d-chloroform. The smaller peaks at 33.38, 4.03 and 4.35 ppm are due to a non-covalent association phenomenon.
Figure 21:
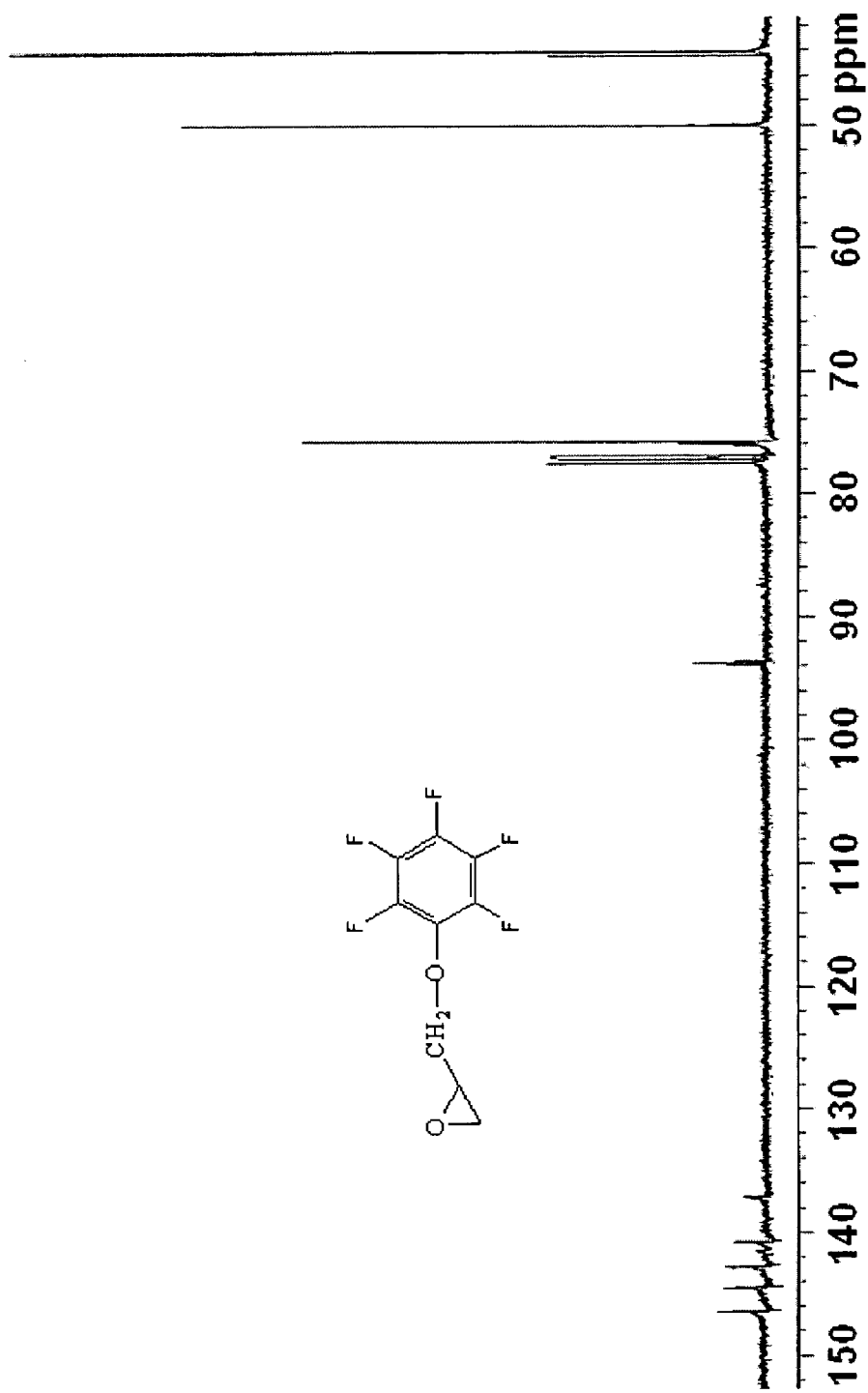
FIG. 21 is a graph showing 75 MHz 13-C MHz NMR spectrum of glycidyl pentafluoro-phenyl ether in d-chloroform.
Figure 22:
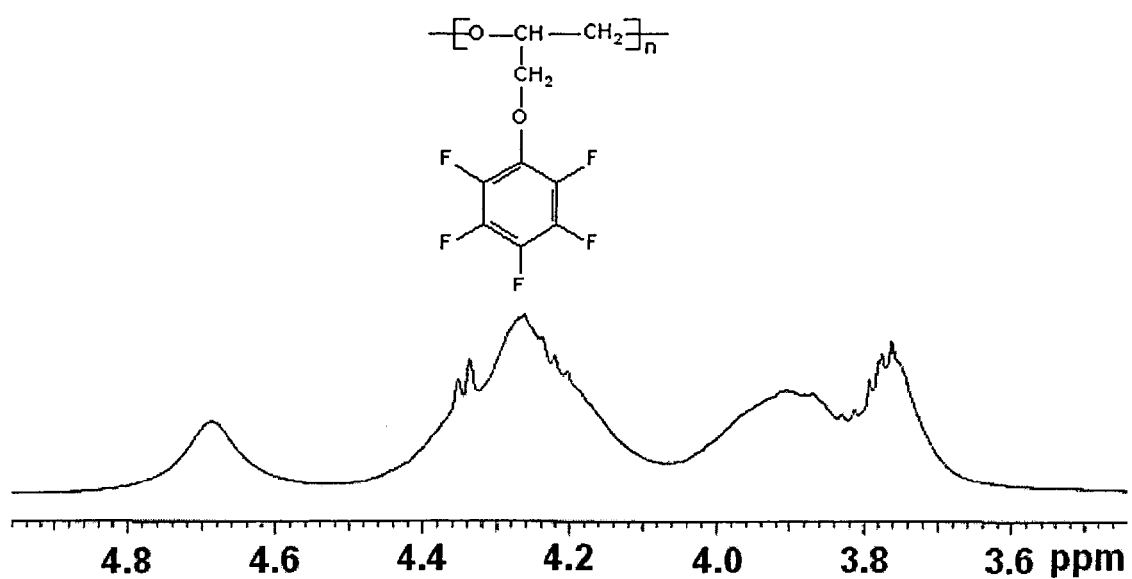
FIG. 22 is a graph showing 300 MHz proton NMR spectrum of poly(glycidyl pentafluoro-phenyl ether) in d-chloroform.
Figure 23:
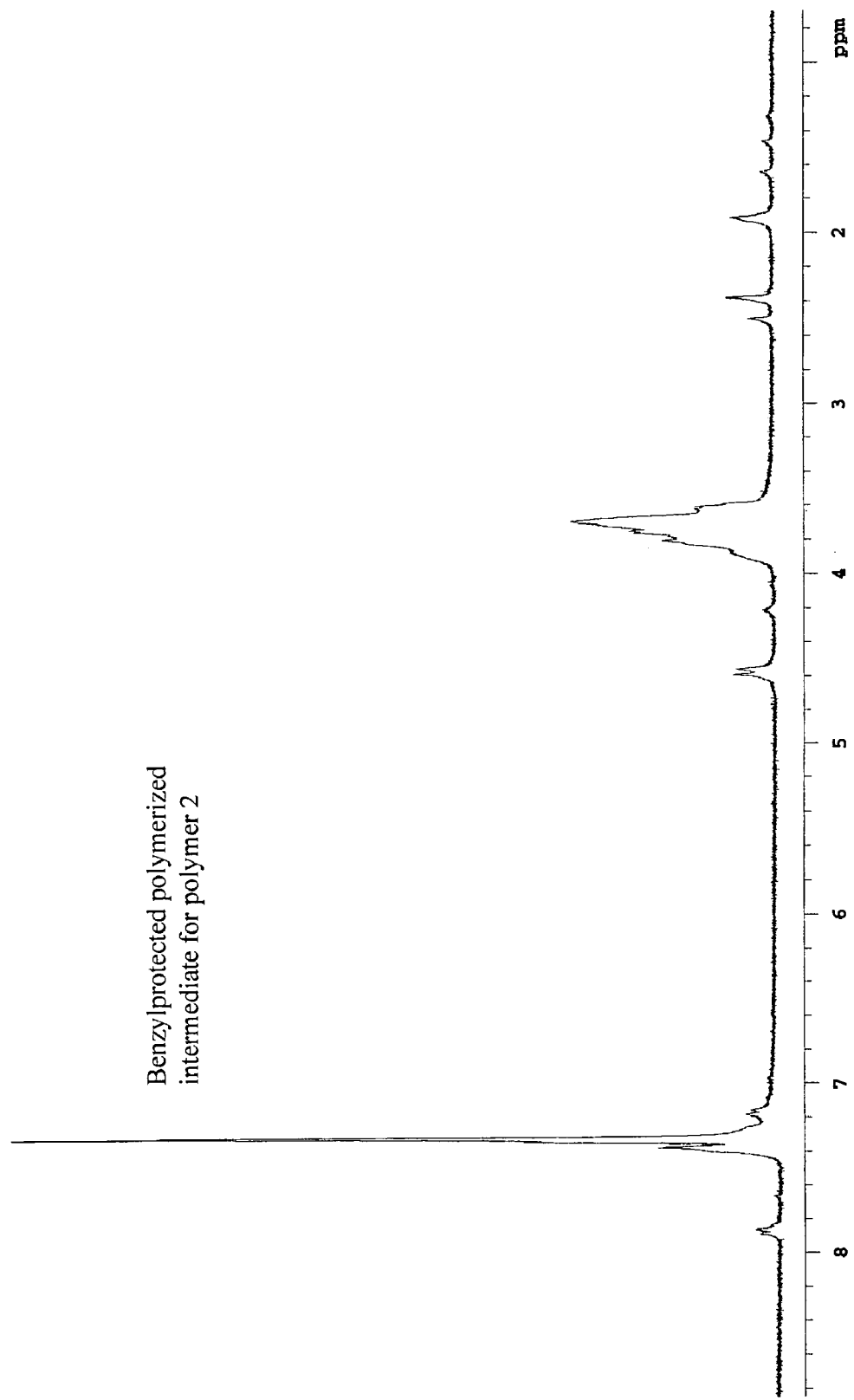
FIG. 23 is a graph showing 300 MHz proton NMR spectrum of poly(1-benzyloxymethyl pentaethylene glycol) (6).

Poly(glycidyl pentafluorophenyl ether) 3 was obtained by cationic polymerization of the corresponding epoxy monomer 2. Antimony (V) chloride ($SbCl_5$) was used as the polymerization catalyst. The initial concentrations of the epoxy monomer and catalyst in dichloromethane were: [monomer]=2.0 mol/l; [$SbCl_5$]=0.02 mol/l. The reaction was carried out at 25° C. under argon protection. Polymer 3 was dried under vacuum at ambient temperature. Molecular weight (MW) of polymer 3 was estimated by gel permeation chromatography (GPC) using "Shodex Asahipak GS-310 7G" column and THF as eluant (FIG. 20).

Metallation (doping) of polymer 1. The doped polymer materials were prepared by reacting alkali metals with the synthesized polymer. The polymer was first fractionated by gel operation chromatography into high, medium and low molecular weight fractions. The high and medium molecular weight fractions were used. Metallation was performed in an argon chamber. The polymer was dissolved in THF and the required amount of metal (potassium, sodium or lithium) was added at room temperature. The temperature was then raised gradually until it was 5° C. above the metal's melting point keeping the temperature at this value until all of it had melted and reacted with the polymer. A solution of the alkali metal doped polyglycidyl pentafluorophenyl ether) in tetrahydrofuran (THF) is a purple color. The color allows coupling of optical, magnetic and electronic properties.

EXAMPLE 2

Preparation of Polymer 2.

(a). Preparation of poly(1-benzyloxymethyl pentaethylene glycol) (6) The mole ratio of the starting materials was: compound 4/compound 5/sodium hydride=1.0/1.0/3.0. 0.016 mol. Sodium hydride was washed with 50 ml hexanes before use. 0.0055 Mol (R)-(+)-1-benzylglycerol (compound 4) was dissolved in 10 ml THF and added to the sodium hydride at 0° C. The solution of 0.0055 mol tetra (ethylene glycol) di-p-tosylate (compound 5) in 15 ml THF was then slowly added through a dropping funnel. There was rapid evolution of hydrogen and the reaction mixture became viscous. The temperature was increased and the mixture was refluxed for 24 h. After the reaction was done, the solution was stripped of THF and 200 ml 2:1 dichloromethane/$H_2O$ was added. TsONa was dissolved in water while most of the product was in the organic layer. The solvent was removed under reduced pressure to give polymer 6, which is yellow sticky liquid.

(b) Deprotection of poly(1-benzyloxymethyl pentaetylene glycol). Polymer 6 was diluted in ethanol to form a 10% solution. The amount of catalyst used was: 10% Pd-C/polymer 6=5 weight % relative to benzylated polymer. The pressure of hydrogen was 20 psi. The reaction mixture was stirred at r.t. for 48 h to give the reduction product (polymer 7) in quantitative yield. Care was taken to remove any ethanol from the product before the subsequent esterification step.

Figure 24:
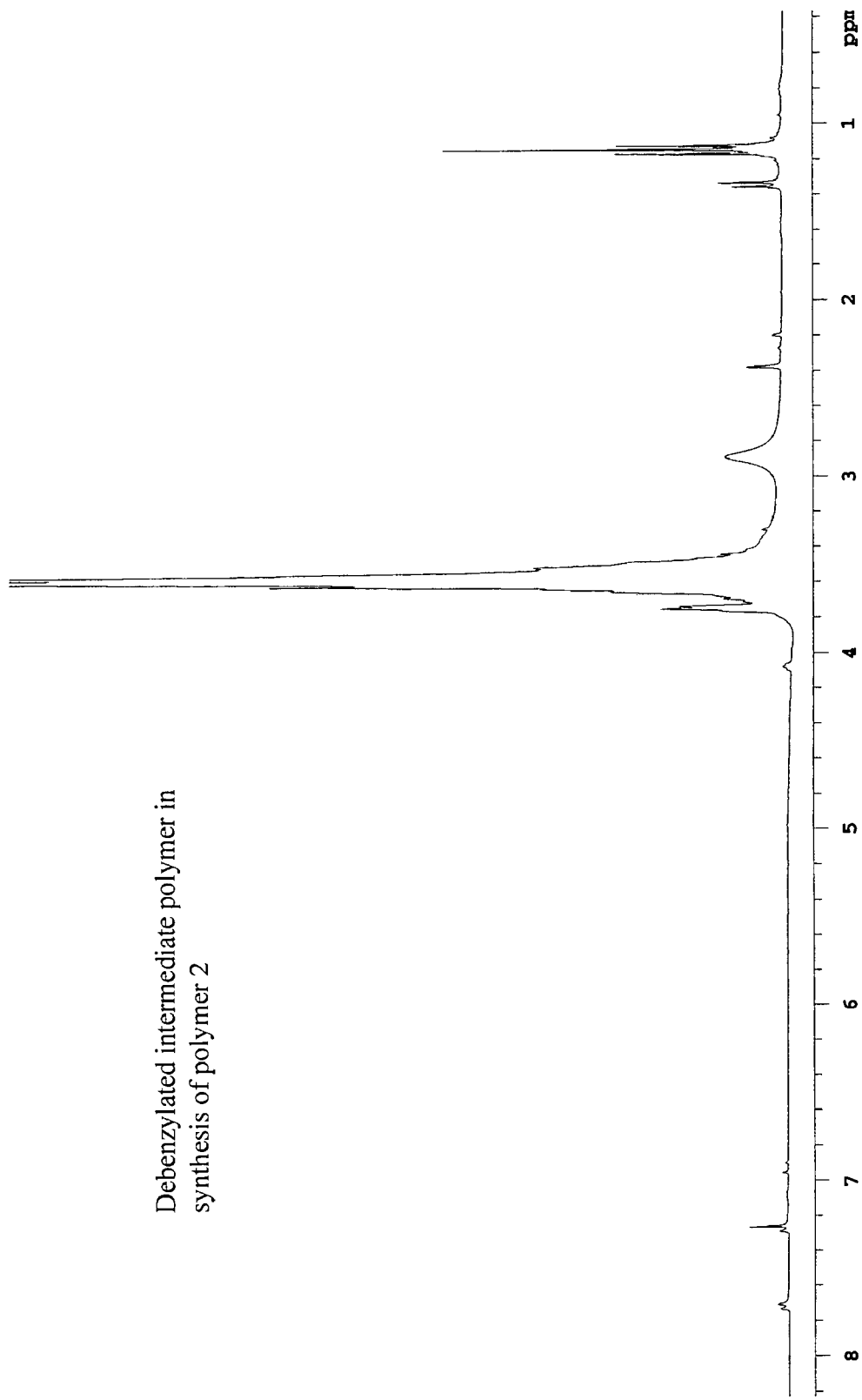
FIG. 24 is a graph showing 300 MHz proton NMR spectrum of poly(1-hydroxymethyl pentaethylene glycol) (7).
Figure 25:
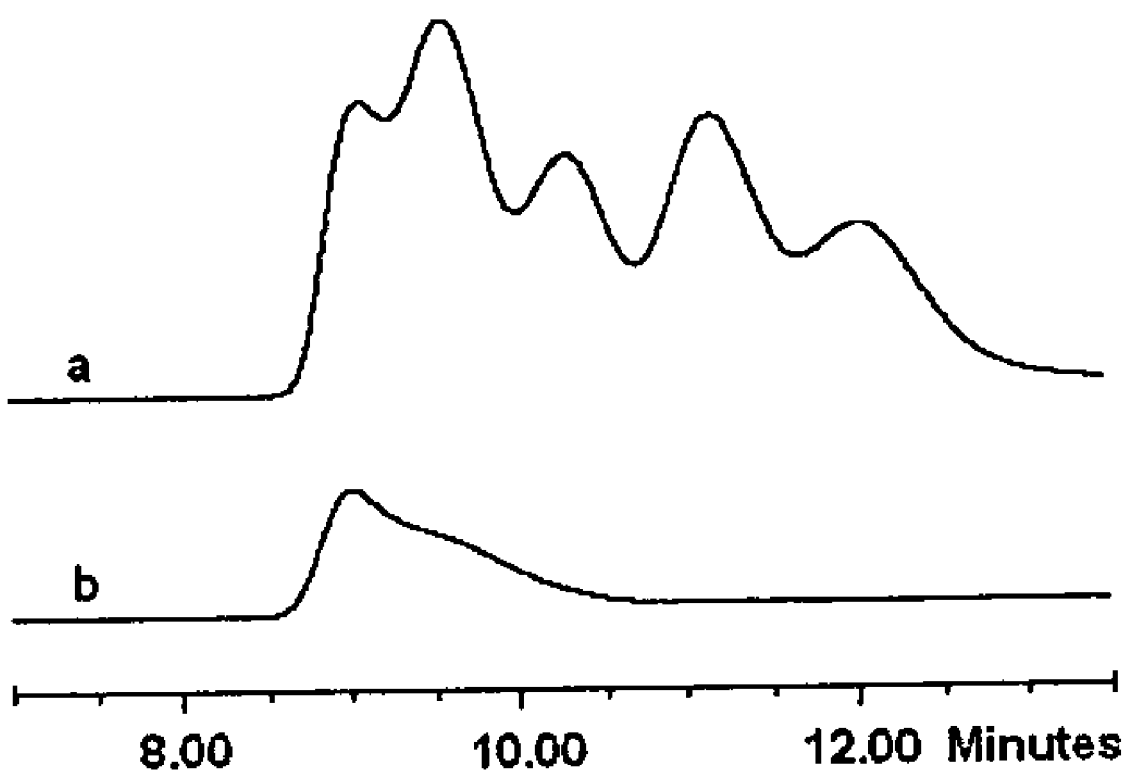
FIG. 25 is a graph showing GPC chromatogram of (a) Polystyrene standards: MW=38100, 21000, 10050, 4920, 2350; Retention time (min)=8.68, 9.22, 9.95, 10.78, 11.67 (b) poly(1-(3,5-dinitro)benzoyloxymethyl pentaethylene glycol): Retention time=8.87 min. High (10,000–50,000 da), medium (2,000–10,000 da) and low (<2,000 da) molecular weight fractions were segregated.
Figure 26:
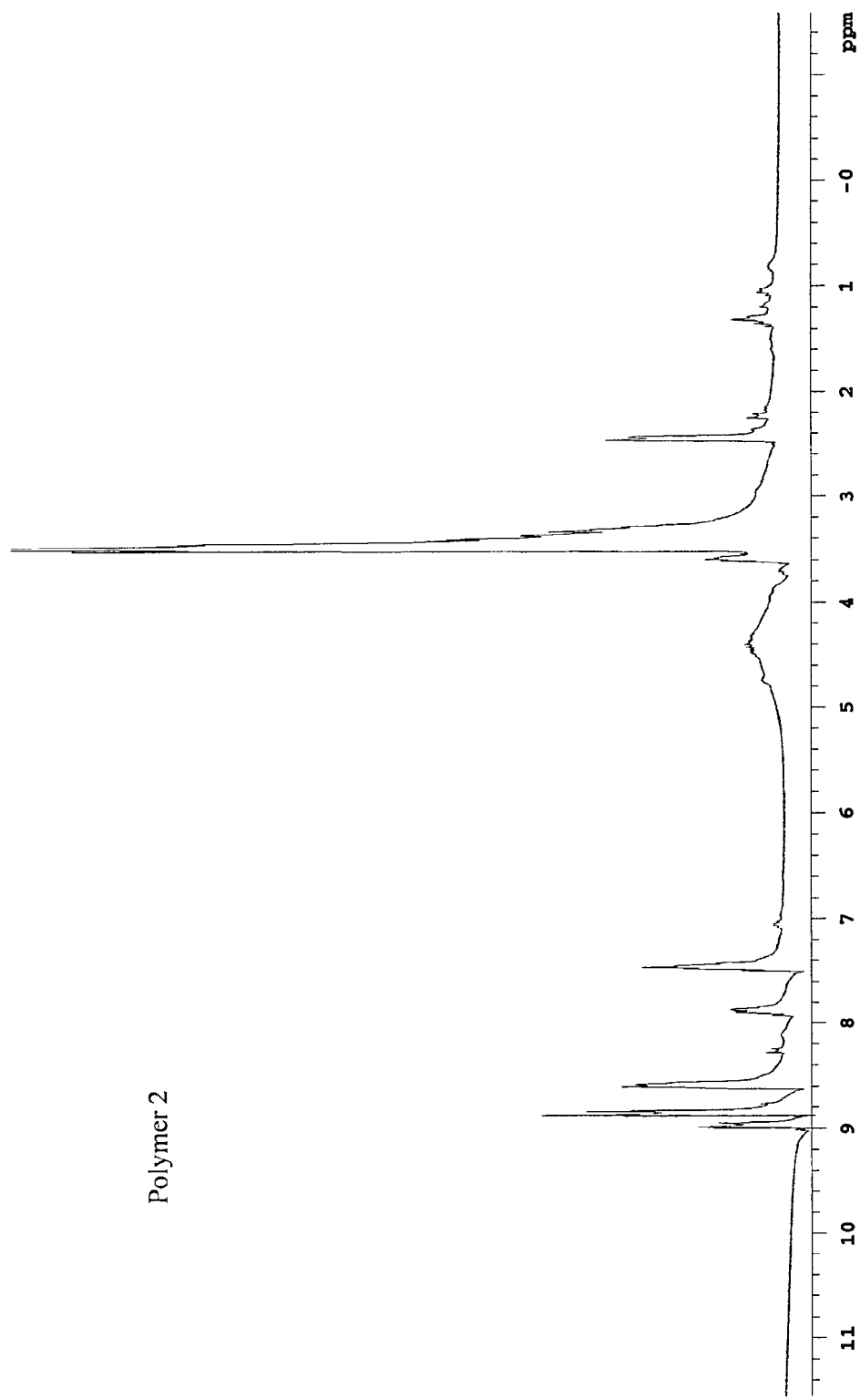
FIG. 26 is a graph showing 300 MHz proton NMR spectrum of polymer.
Figure 27:
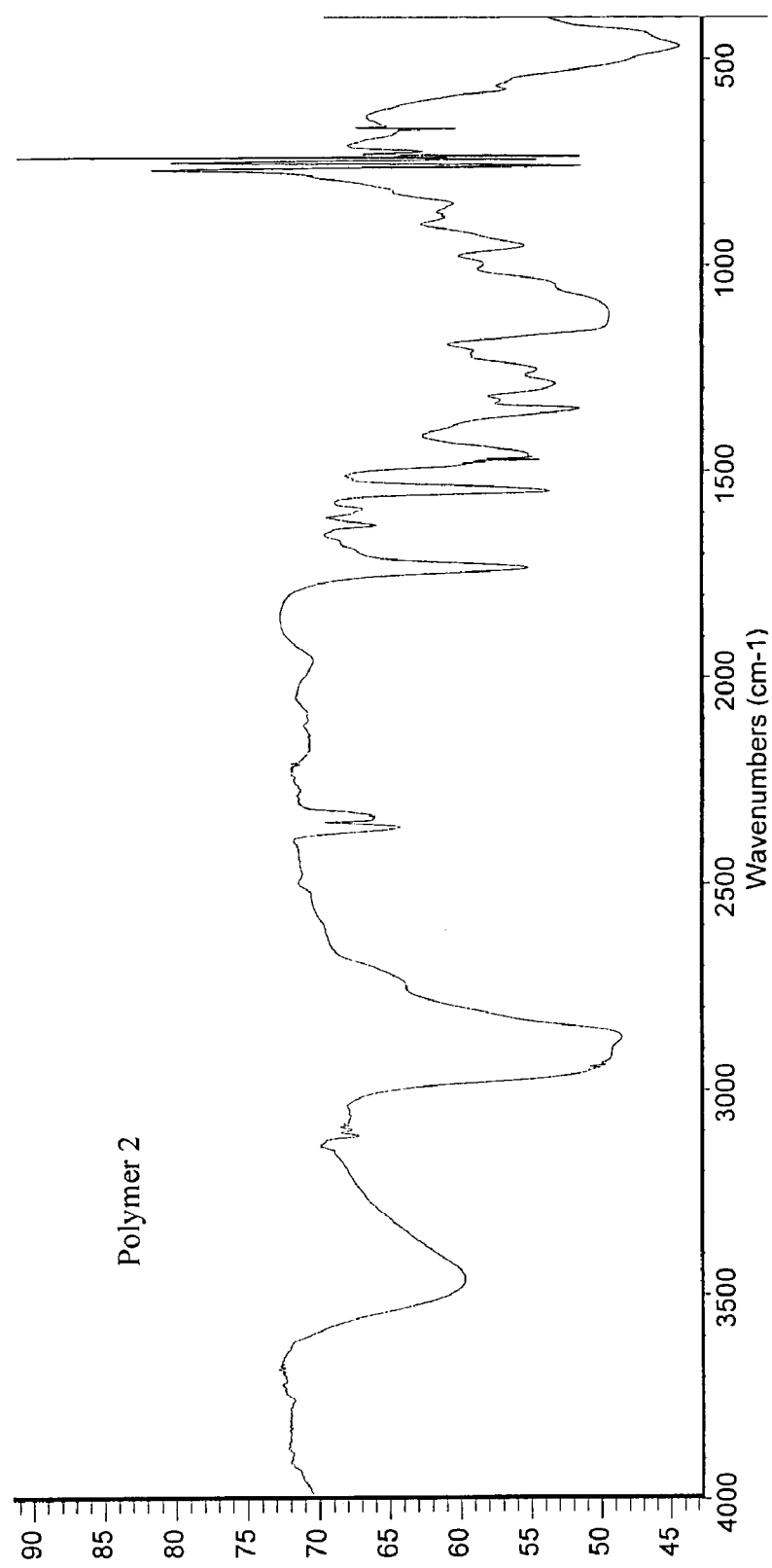
FIG. 27 is a graph showing IR spectrum of polymer 2.
Figure 28:
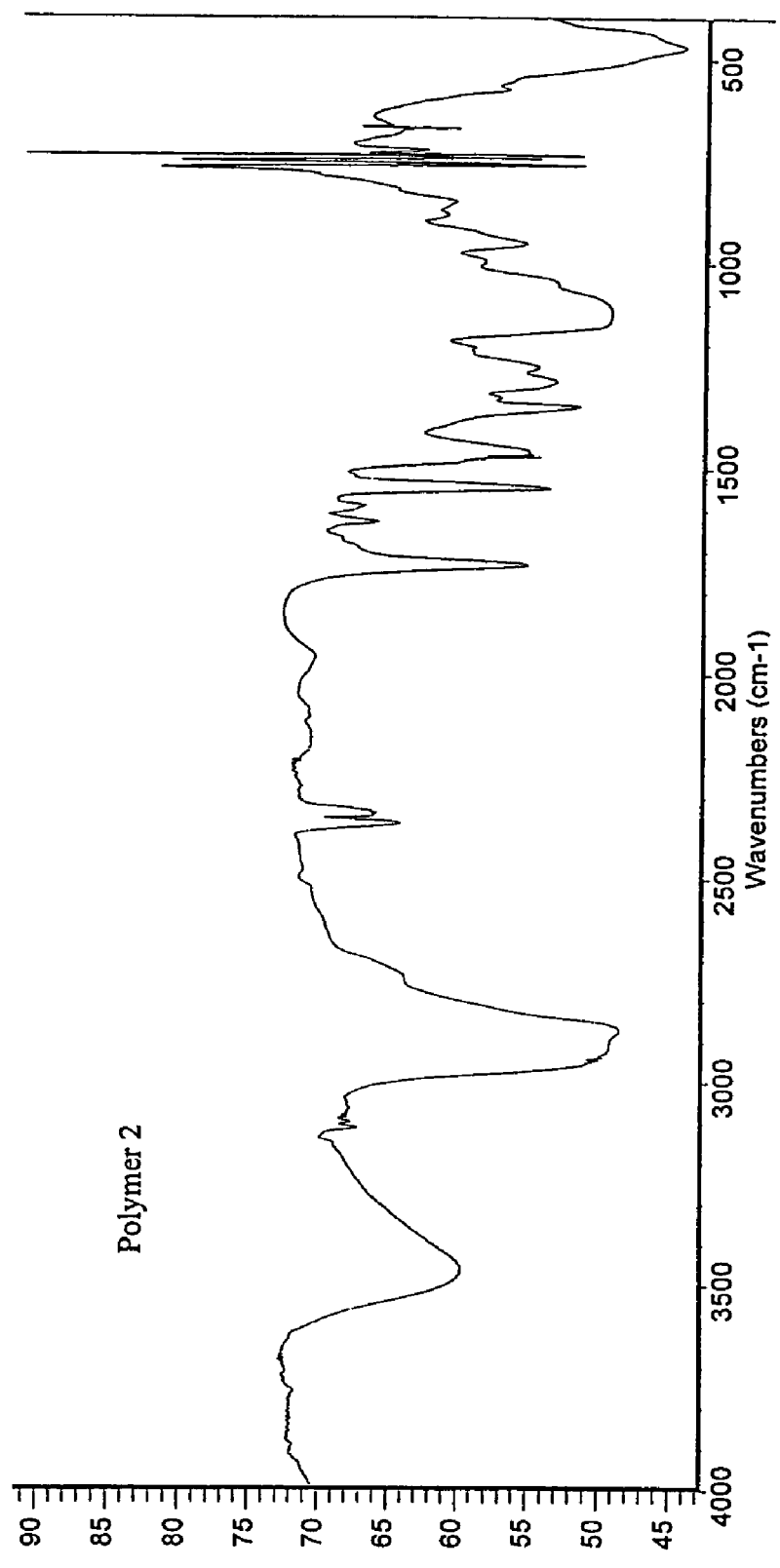
FIG. 28 is a graph showing 300 MHz proton spectrum of polymer 3.
Figure 29:
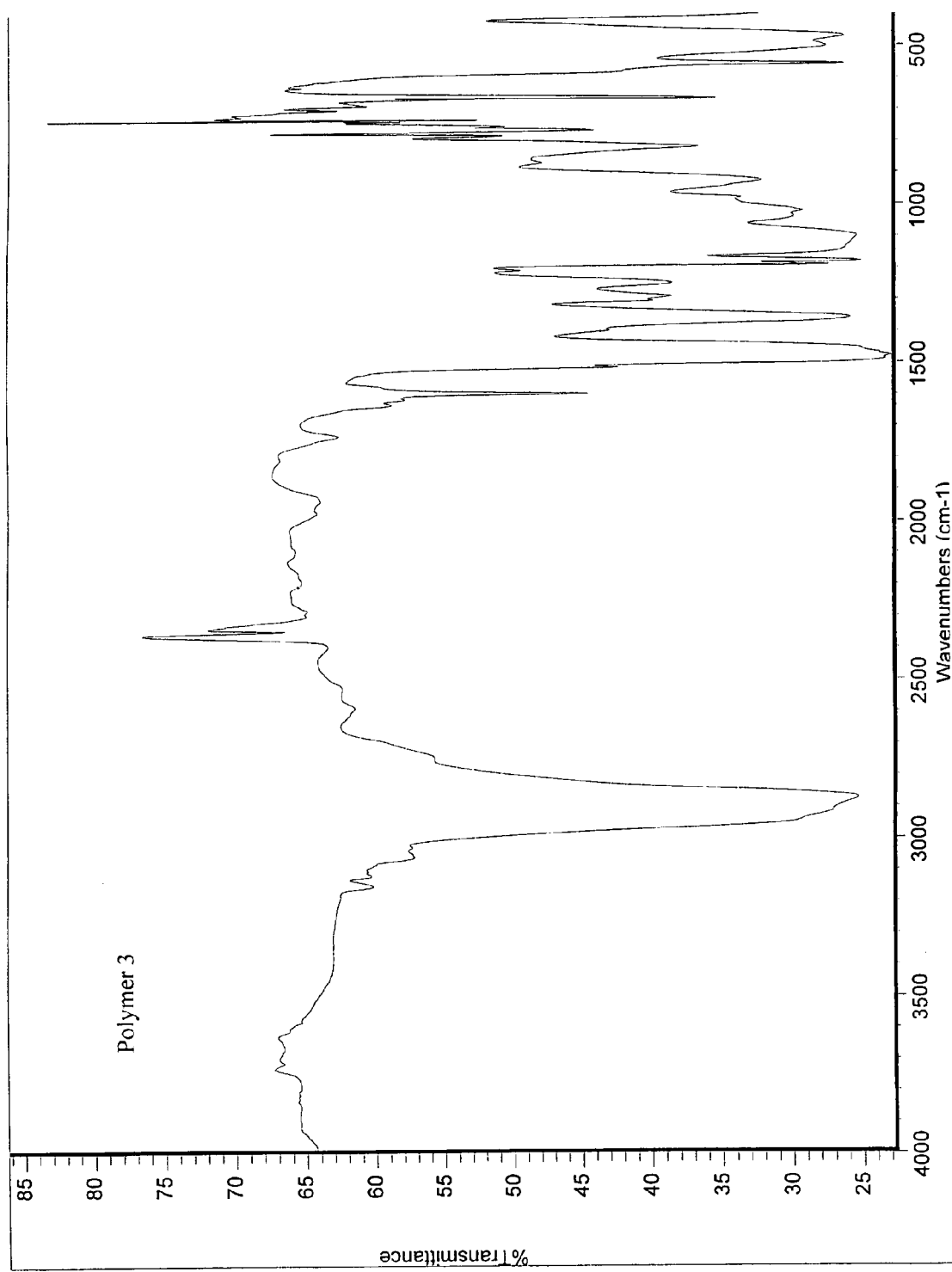
FIG. 29 is a graph showing IR spectrum of polymer 3.

(c). Poly(1-(3,5-dinitro)benzoyloxymethyl pentaethylene glycol) The mole ratio of the starting materials was: monomer units of polymer 7/3,5-dinitrobenzoyl chloride=1.0/1.2. The reaction was carried out in pyridine at room temperature. Polymer 9 is soluble in chloroform while excess 3,5-dinitrobenzoyl chloride:pyridine complex and pyridinium chloride have very low solubility and therefore could be easily filtered off from the chloroform layer. Polymer 9 was then purified by gel permeation chromatography (GPC) using "Sephadex LH-20" gel with THF as the eluant. The molecular weight (MW) was estimated by HPLC using "Shodex Asahipak GS-310 7G" column and THF as eluant (FIG. 24).

Poly(1-(3,5-dinitro)benzoyloxymethyl pentaethylene glycol) exhibits good solubility in common organic solvents such as acetone, chloroform, dichloromethane, THF, DMF and DMSO at room temperature.

EXAMPLE 3

Preparation of poly(1-(pentafluorophenoxymethyl)pentaethyleneglycol)(Polymer 3).

(a). Preparation of (2,2-dimethyl-1,3-dioxolane-4-methanol)pentafluorophenyl ether (10): sodium hydride (5.1 g of 1 60% dispersion in oil) in a round bottom flask was washed with 200 ml hexanes. The slurry was allowed to stand and the hexane decanted. Tetrahydrofuran (500 ml) was then added. The mixture was cooled in ice and solketol (13.2 g) was slowly added. After evolution of gas had ceased bromopentafluorobenzene (24.7 g) was added slowly over a period of 30 min. The ice bath was removed and the reaction mixture stirred at room temperature for 12 h. After the reaction was done, excess sodium hydride was destroyed by addition of ethanol. The reaction mixture was stripped of solvent and then 400 ml of 2:1 $CH_2Cl_2/H_2O$ was added. The organic layer was dried recovered and dried with anhydrous sodium sulfate and concentrated to give the orange colored compound 10.

(b). Hydrolysis of (2,2-dimethyl-1,3-dioxolane-4-methanol)pentafluorophenyl ether: 88% Formic acid was added to a 30% solution of compound 10 in ethanol. The reaction mixture was refluxed for 12 h, then 1 ml 36% hydrochloric acid was added and the solution was refluxed for another 12 h. Some white deposit was formed which was readily soluble in water but was insoluble in ordinary organic solvents such as $CHCl_3$ or DMSO. NMR analysis indicated that this white solid was not the product and was therefore filtered off from the reaction mixture. The filtrate was condensed and the crude product was purified by flash column chromatography using 9:1 chloroform/ethyl acetate as the eluant to give compound 11.

(c). Poly(1-(pentafluorophenoxy-methyl)pentaethyleneglycol): The mole ratio of the starting materials was: compound 11/compound 12/sodium hydride 1.0/1.0/3.0, 1.2 g 60% sodium hydride was washed with 50 ml hexanes before use. Compound 11 (2.58 g) was dissolved in 5 ml THF and added to a mixture of sodium hydride (1.2 g) in 15 ml THF at 0° C. There was rapid evolution of hydrogen. A solution of tetra(ethylene glycol)di-p-tosylate (compound 12) (5.14 g) in 5 ml THF was then added slowly through a dropping funnel. The reaction mixture was then refluxed for 24 h. The crude product was washed with water thoroughly to remove TsONa and then dried in air. Polymer 13 is pale yellow sticky solid, it doesn't melt at 250° C. Molecular weight (MW) of polymer 13 was estimated by HPLC using "Shodex Asahipak GS-310 7G" column and THF as the eluant. Some fraction of the polymer could not be dissolved in THF and was considered to have very high MW.

EXAMPLE 4

The Characterization of the Materials of Examples 1, 2 and 3 is Shown in FIGS. 6 to 35B Gel Permeation Chromatography Gel Permeation Chromatography (GPC) was carried out using a Waters system equipped with a Waters 2414 refractive index detector and a Waters 2487 dual λ absorbence UV detector, with THF as the eluant, at room temperature.

FT-IR Spectroscopy

The FT-IR spectra were recorded on a Nicolet 710 FT-IR spectrometer.

NMR Spectroscopy

NMR measurements were made in $CDCl_3$ at room temperature on a Varian VXR 500 MHz spectrometer.

UV-Visible Spectroscopy

UV-vis spectra was taken in a Hewlett Packard 8452A diode array spectrophotometer.

SQUID Measurements

Magnetic properties of the materials were measured using a Quantum Design MPMS XL SQUID (Superconducting Quantum Interference Device) magnetometer. Samples were transferred to polycarbonate capsules under an atmosphere of dry argon and were loaded at room temperature in zero magnetic field. Both the temperature dependence of mass susceptibility at specific fields and the field dependence of magnetization at specific temperatures were measured. The magnetic moments of the empty capsules were acquired and subtracted from the data.

Conductivity Measurement

Electrical resistance measurements were made using the two-probe technique. The doped polymers were dissolved in THF to get a series of solutions with different concentrations. Two platinum electrodes (The diameter of the platinum wire is 0.5 mm; The distance between two electrodes is 3 mm) were immersed in these solutions and the other ends of the electrodes were connected to a RadioShack autoranging digital multimeter to measure the resistance of these solutions. To avoid any contamination these measurements were performed in a glove-box filled with argon. Data were collected at room temperature.

EPR Spectroscopy

EPR measurements were made on a Bruker ESP 300E spectrometer in high-purity He gas. The doped samples were dissolved in THF and sealed in quartz tubes under argon protection to avoid any contamination.

Characterization of Poly(glycidyl pentafluorophenyl ether)

Solubility

Poly(glycidyl pentafluorophenyl ether) exhibits good solubility in common organic solvents such as acetone, chloroform, dichloromethane, THF, DMF, and DMSO at room temperature. The excellent solubility is an indication that this processable polymer has enough scope for technological application.

GPC Results

The molecular weight of poly(glycidyl pentafluorophenyl ether) was measured by means of GPC using THF as eluant against polystyrene standards. The average molecular weight and the molecular weight distribution were calculated by means of standard curves shown in FIG. 19B: $K_{av}=(t_e-t_0)/(t_t-t_0)$; $t_o=7.049$ min based on blue dextran; $t_t=12.058$ min based on glucose; $t_e$ is the retention time of the measured polymer.

Figure 19A:
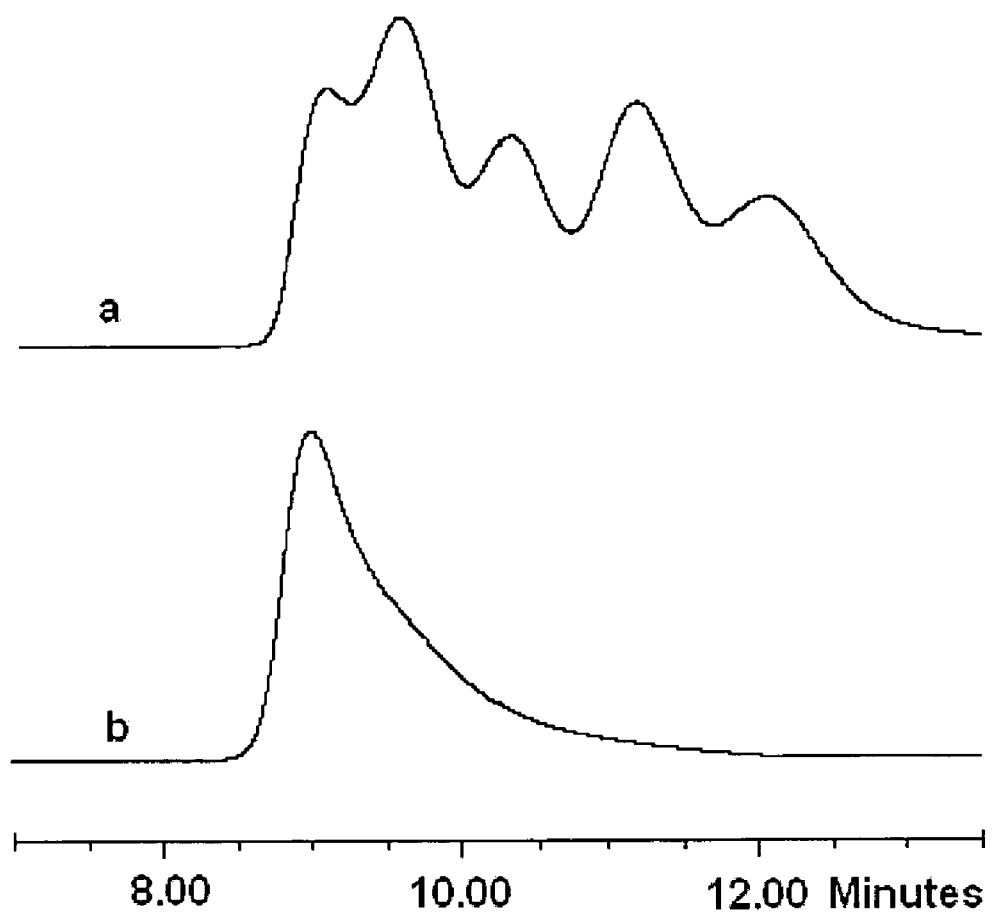
FIG. 19A is a graph showing GPC chromatogram of (a) Polystyrene standards: MW=38100, 21000, 100050, 4920, 2350; Retention time (min)=8.675, 9.216, 9.950, 10.783, 11.665. (b) Poly(glycidyl pentafluorophenyl ether): Retention time=8.64 min. High (10,000–50,000 da), medium (2,000–10,000 da) and low (<2,000 da) molecular weight fractions were segregated.
Figure 19B:
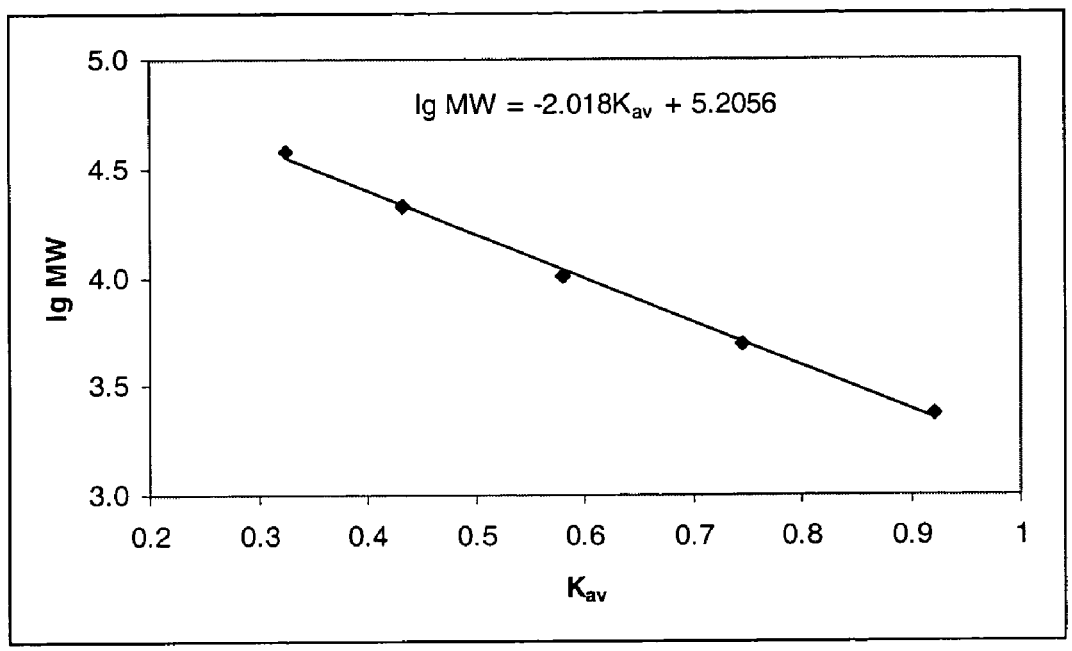
FIG. 19B is a graph showing a logarithmic MW versus $K_{av}$ standard curve for poly(glycidyl pentafluorophenyl ether).

The GPC chromatogram of poly(glycidyl pentafluorophenyl ether) is shown in the FIG. 19A. The average molecular weight is 36633. The molecular weight distribution is 10000–50000. This high molecular weight was also confirmed by mass spectrum (MALDI).

Characterization of the Doped Poly(glycidyl pentafluorophenyl ether)

Treatment of poly(glycidyl pentafluorophenyl ether) with sodium, potassium or a mixture of these metals in tetrahydrofuran under an argon atmosphere at room temperature led to the rapid but smooth dissolution of the metal and an immediate color change. The pink colors of the solutions were stable for several weeks at room temperature with a minimum of protection from moisture and oxygen. They did vary with the type and, to a great extent, amount of the alkali metal that was used in the doping process.

UV-Visible Spectra

Figure 12:
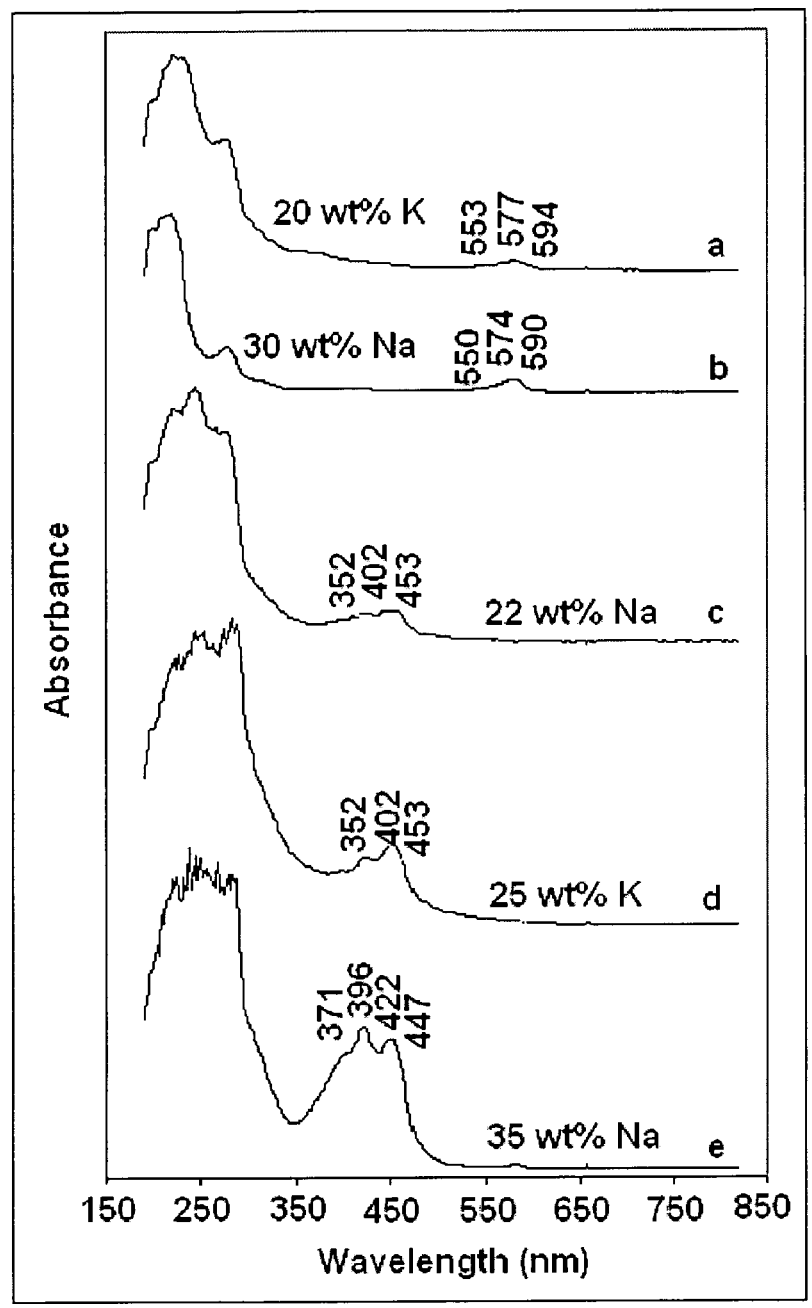
FIG. 12 is a graph showing UV-vis spectra of the doped polymer 1. (a) (b) (c): High MW fraction (10000–50000 daltons); (d) (e): Medium MW fraction (2000–10000 daltons).
Figure 31A:
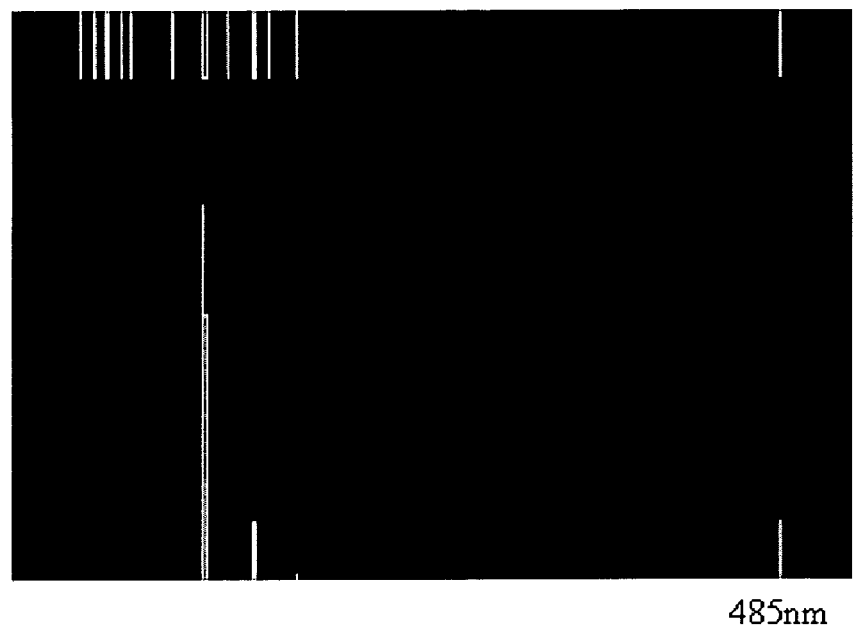
FIGS. 31A and 31B illustrates UV-vis spectra of hexafluorobenzene radical anion (FIG. 31A) and methoxy-pentafluorobenzene radical anion (FIG. 31B) from Zindo calculations.
Figure 31B:
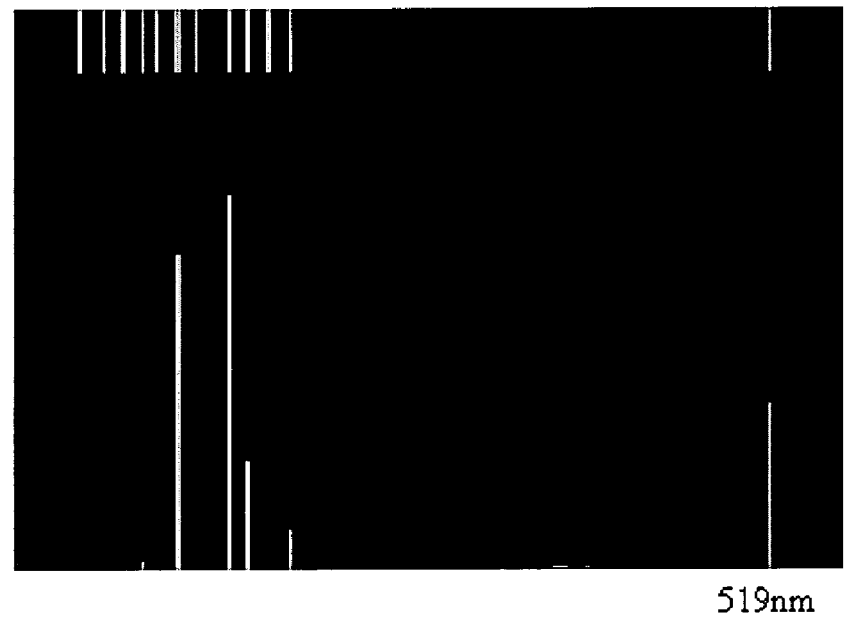

The UV-vis absorption spectra of the alkali metal-doped poly(glycidyl pentafluorophenyl ether) were shown in FIG. 12. Dissolving the doped polymers in THF produced a series of pink color solutions which showed bands in the UV and visible regions. The bands generally showed fine structure (several branches) indicating vibrational coupling to the electronic levels. The absorption bands in the near UV to visible region of the spectrum of the medium molecular weight material doped with 35% sodium appeared between 360 and 460 nm with maxima at 371, 396, 422 and 447 nm. The same material doped with 25% potassium had maxima at 352, 402 and 453 nm. The region in which these bands occurred compared favorably with reported values of 450 nm and 480 nm for the hexafluorobenzene radical anion. Bands in the visible region of the spectrum for the higher molecular weight material generally appeared at considerably longer wavelengths. Material doped with 20% potassium had bands at 553, 577 and 594 nm however material doped with similar amounts of sodium had bands at 352, 402 and 453 nm. Doping with much higher concentrations of sodium (30%) resulted in bands at 550, 574 and 590 nm, considerably longer wavelength than was observed with the lower molecular weight material when it was treated with even higher (35%) amounts of sodium. Zindo calculations of UV-visible spectral frequencies and oscillator strengths for hexafluorobenzene and the model system methoxy-2,3,4,5,6-pentafluorobenzene gave a value of 485 and 519 nm respectively (FIGS. 31A and 31B). The value of 485 nm is in agreement with experimental results for hexafluorobenzene. The value of 519 nm is between the range observed for the doped medium and high molecular weight polymer.

The absorption maximum for the high molecular weight material generally occurred at significantly longer wavelength. This 150 nm red shift indicates that there are some stacking interactions that are contributing to a delocalized orbital system or band structure involving several aromatic groups. This will be favored in the higher molecular weight systems because of greater rigidity, a higher density of packing of groups and more regions of crystallinity and order.

The nature and concentration of the metal in the polymeric matrix are two other very important factors in promoting stacking or multicenter interactions that lead to this 150 nm red shift in the visible region of the spectrum. All three of these factors should promote the helical polyether conformation forcing the formation of the pentafluorophenyl sheath around the metallated polyether core thus enabling band formation. Evidence for stacking was raised in a previous study when a concentration-dependent shift in the absorption maximum was noted for hexafluorobenzene.[19] The phenomenon here is more than this. There is not a gradual shift in absorbence but a rather dramatic shift of 150 nm indicating a conformational shift, phase change or change in electronic state. The other dimension of these new materials that is yet to be considered is the nature of the metal species formed on dissociative solvation of sodium and potassium. Several states are possible involving various equilibria between these states. Contributions to these equilibria from metal cations, alkalides, electrides and diatomic metal molecules might all be possible. Such equilibria will affect the electronic state of the aromatic system and have a significant effect on the visible spectra.

Magnetic Properties

The fate and behavior of the electrons produced by the dissociation of the alkali metal is an important determinant of the properties of the new polyether material. If the electrons are held too tightly in the radical anion they might not be available as charge carriers and the material might be largely paramagnetic. There might be a population of free electrons that could couple strongly giving the material an antiferromagnetic character. $\pi$-Orbital overlap between closely spaced and aligned pentafluorophenyl groups should lead to energy bands resulting in new optical, electronic and magnetic properties. Electrons might then readily diffuse through the pentafluorophenyl clusters from ring to ring with varying degrees fo coupling with each other. The physical path they take and the nature of the surface is also a question. They could travel around the cylinder in circular or helical paths or they could migrate in a linear fashion from end to end. The path would be very dependent on the presence and strength of magnetic fields.

Magnetic measurements were taken in four different magnetic fields (1000 Oe, 3000 Oe, 5000 Oe and 10000 Oe) and the temperature range was 5 K–300 K. Also measurements were taken in two different temperatures (5 K and 300 K) and the magnetic field range was 0 Oe–10000 Oe.

Figure 6:
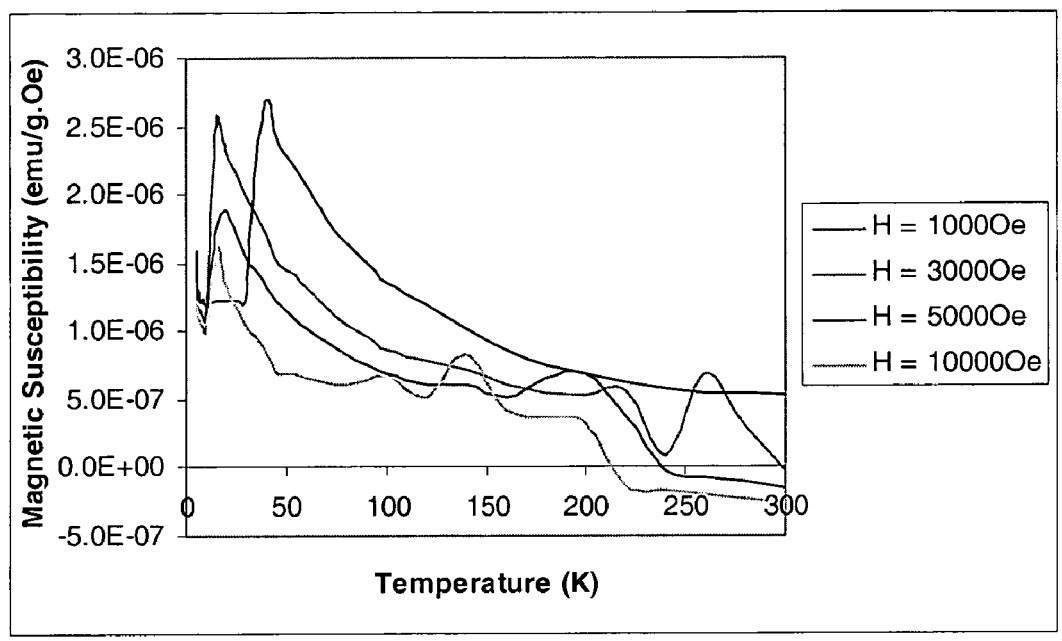
FIG. 6 is a graph showing 20 wt % potassium doped high MW poly(glycidyl pentafluorophenyl ether) antiferrimagnetic behavior at different fields superimposed on more chaotic behavior at higher fields. Note behavior at low temperature characteristic of spin glasses.
Figure 7:
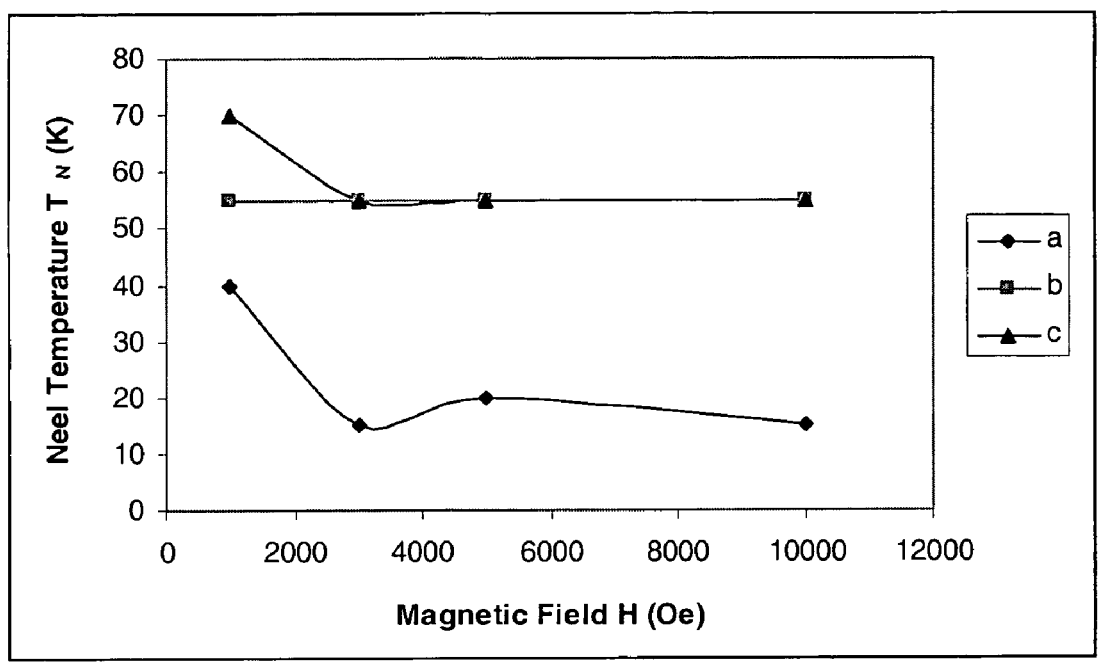
FIG. 7 is a graph showing variation of Neel temperature with magnetic field of potassium-doped polymer 1.

FIG. 6 shows the temperature dependence of the mass susceptibility ($X_g$) of high MW(10000–50000) poly(glycidyl pentafluorophenyl ether) doped with 20 weight % potassium. The classical increase in susceptibility with temperature through a maximum (the Neel point) at constant field and an exponential decay to a limiting value characteristic of antiferromagnetic substances was invariably evident. However, variations on the decay curve past the Neel temperature and variations before the very sharp increase leading up to the Neel temperature were observed. The Neel temperature ($T_N$) is affected by the magnitude of the measuring field, the higher the applied field, the lower the Neel temperature: $T_N$ is about 40 K at 1000 Oe, 20 K at 5000 Oe and 15 K at 10000 Oe. The field dependence of $T_N$ is quite consistent with a situation in which the coercive force of a field and the randomizing effects of temperature are acting together to uncouple spins in an antiferromagnetic system. At low fields one would except the temperature required to be significantly higher.

FIG. 6 shows a rapid decrease in susceptibility between 5 and 10 K before an abrupt increase to the Neel temperature (maximum) for all but the lowest field fo 1000 Oe. In this case the susceptibility stayed constant but positive after the initial drop until approximately 30 K before increasing towards the maximum. This complex behavior might indicate some spontaneous (ferrimagnetic) character that is not readily randomized by temperature especially at lower field. The initial drop in susceptibility with increasing temperature in the low temperature regime indicates paramagnetic character. This unusual behavior before the Neel transition is also characteristic of some low-dimensional systems such as 1-dimensional magnetic systems. The sudden drop in susceptibility at low temperature is attributed to defects in the chain. The variation transitions observed at higher temperature (100 to 300 K) attributable to and indicative of the fundamental nature of the new materials. Unlike metals, inorganics and crystals these are essentially soft organic materials that should form organized structures (liquid crystalline phases) at different temperatures and go through various melting and other phase transitions as the temperature is varied. The applied field should be a large factor in determining the magnetic properties, orientation and stability of these new structures and phases since they will interact with this field. There will be phases that are essentially field induced oriented and stabilized especially at high field. Structures and phases that are stable at lower temperatures can be destroyed as the temperatures increases giving rise to the undulations (transitions) observed between 100 and 300 K especially at the higher field values.

Figure 8:
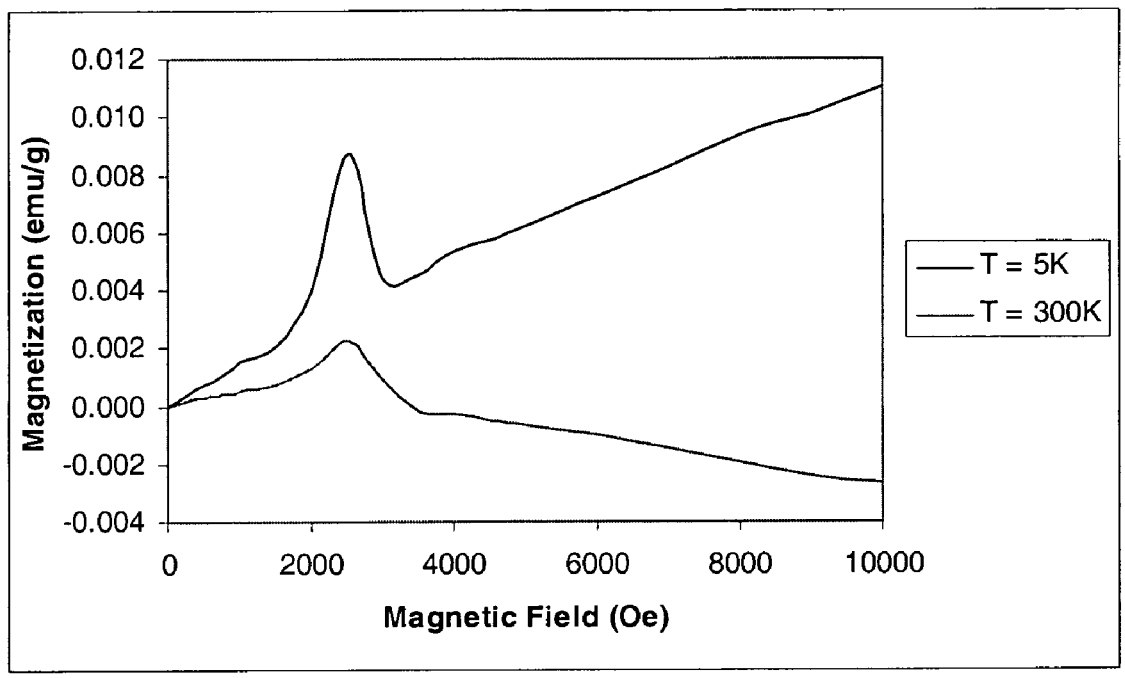
FIG. 8 is a graph showing field dependence of magnetization of 20 wt % potassium doped medium MW poly (glycidyl pentafluorophenyl ether) showing a temperature inversion of slope at ~2500 Oe.

FIG. 8 shows the magnetization vs. magnetic field curves at two different temperatures, non-linearity is clearly observed, confirming the presence of antiferromagnetic interactions.

Figure 9:
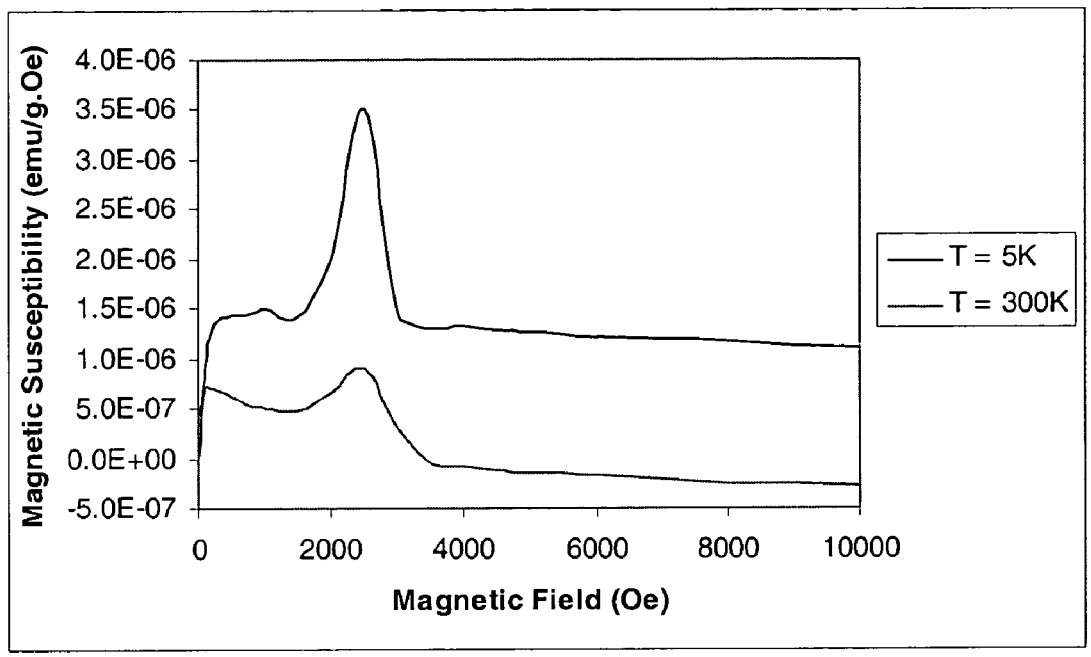
FIG. 9 is a graph slowing field dependence of magnetization of 20 wt % potassium doped high MW poly(glycidyl pentafluorophenyl ether) showing a temperature inversion of slope at ~2500 Oe.
Figure 10:
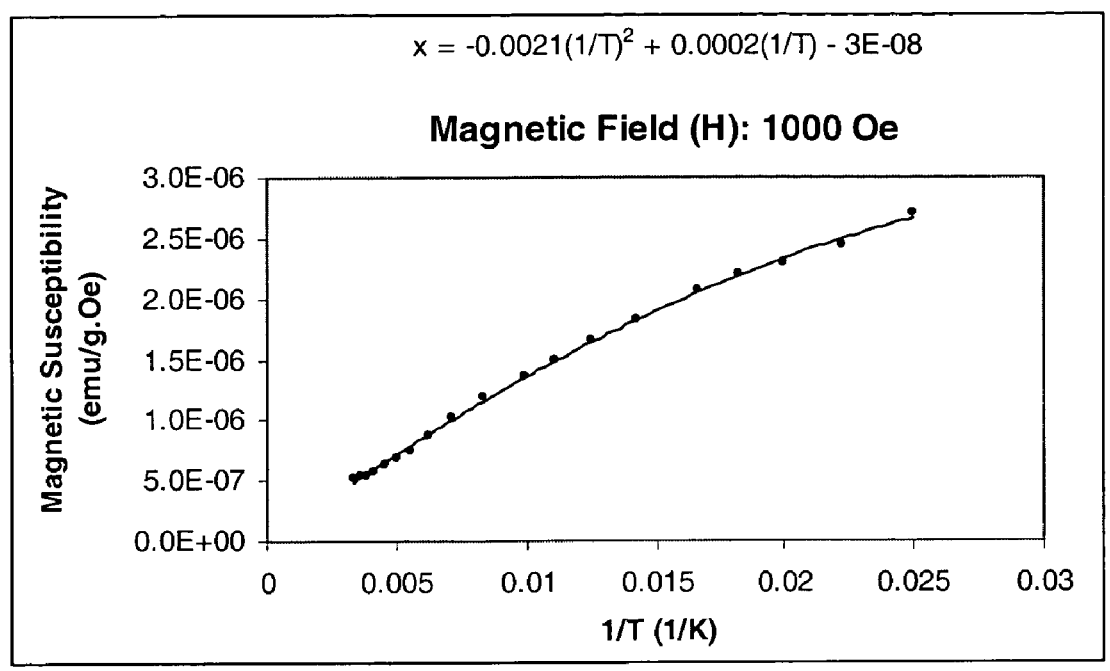
FIG. 10 is a graph showing Non-linear Curie relationship for post Neel transition segment of 1000 Oe curve in FIG. 6.
Figure 11:
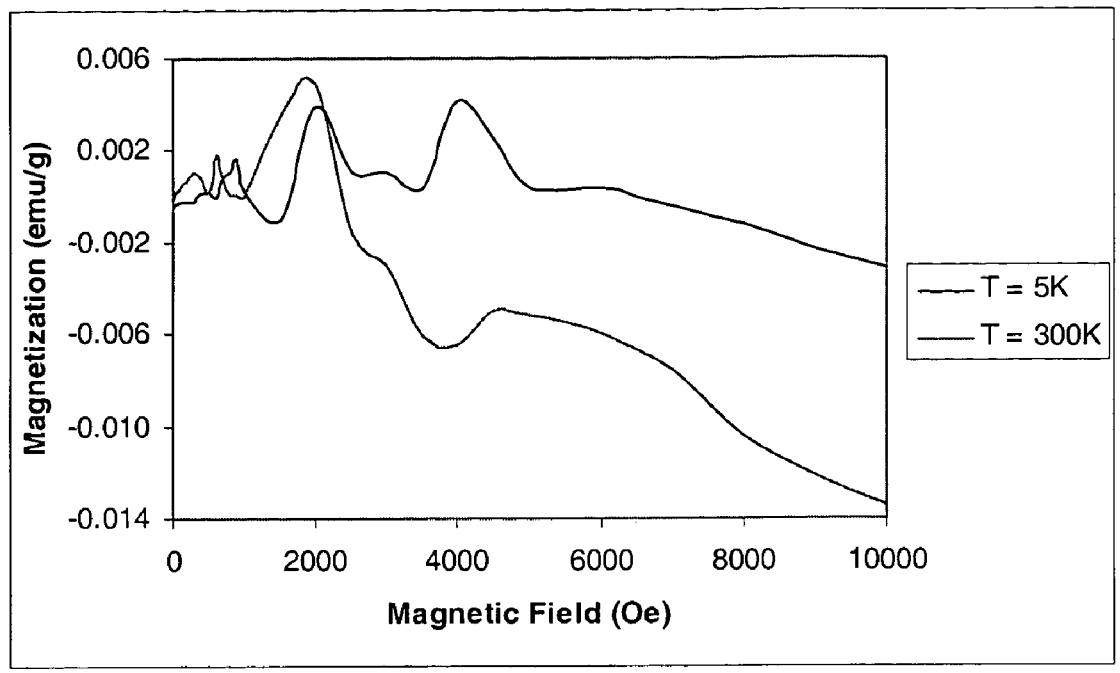
FIG. 11 is a graph showing magnetic properties of high MW poly(glycidyl pentafluorophenyl ether) doped with 22 wt % sodium showing oscillatory field dependence of magnetization at specific temperatures.

As shown in FIG. 9, the classical saturation curve for the paramagnetic component is evident for the 5 K measurement. The paramagnetic component is not as evident at 300 K because of thermal randomization leading to domination by the diamagnetic polymer background at higher field. An important feature of these measurements is the presence of a bell shaped peak between 1800 and 3200 Oe. The position is temperature independent but it is much more prominent at low temperature as judged by the intensity of the peak for the 5 K curve. This suggests the formation of a field-induced but highly magnetic phase that is a special point on the temperature-field-magnetization landscape.

Figure 32A:
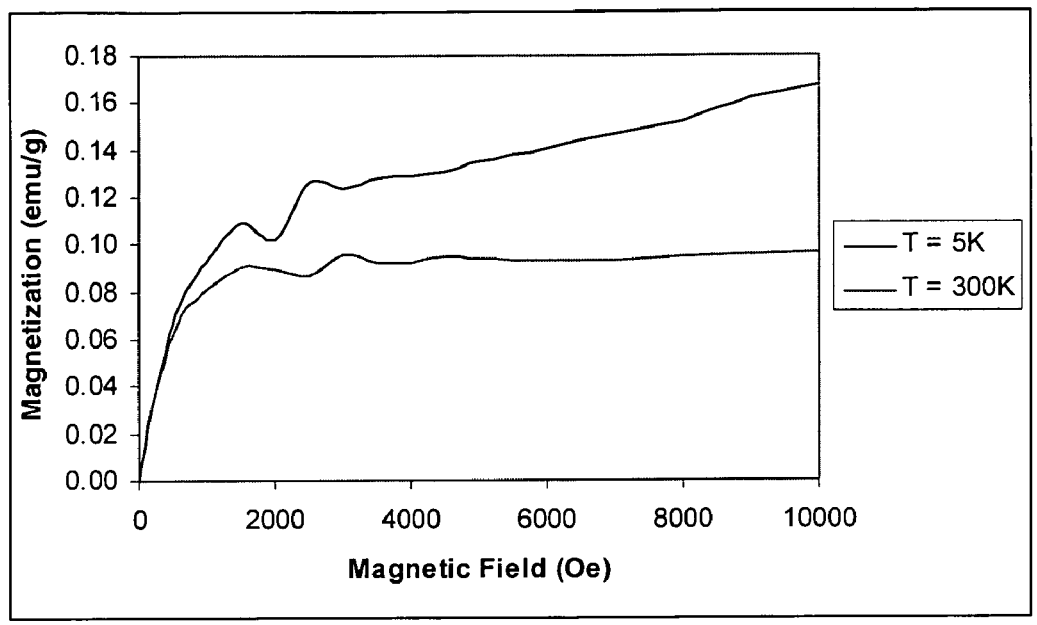
FIGS. 32A and 32B are graphs of the magnetic properties of high MW poly(glycidyl pentafluorophenyl ether) doped with 30 wt % sodium.
Figure 32B:
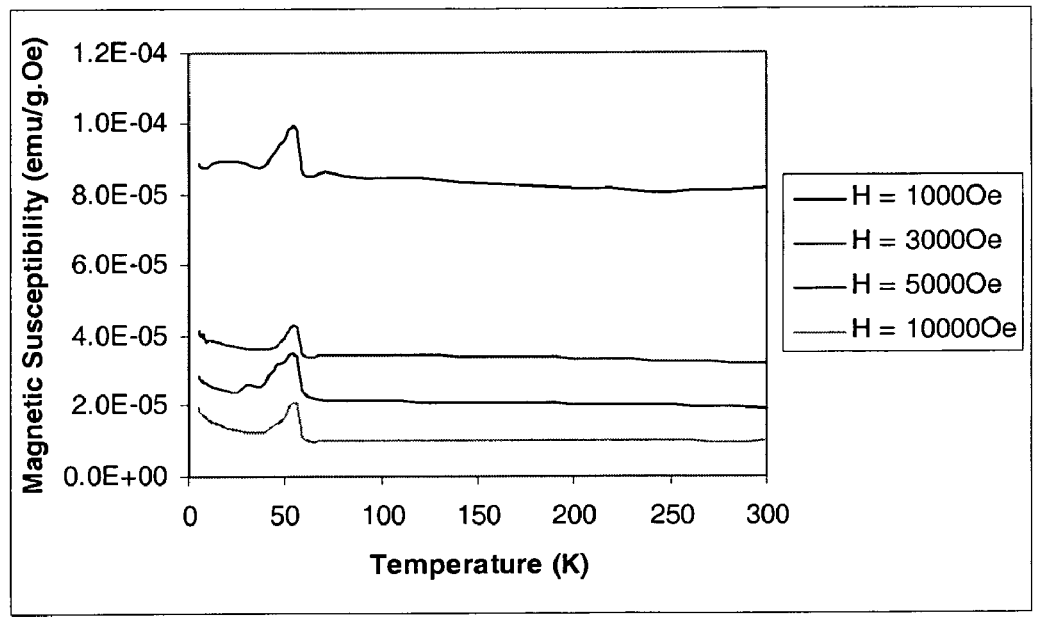

FIGS. 32A and 32B show the field dependence of the magnetization (M) and the temperature dependence of the mass susceptibility ($X_g$) of high MW poly(glycidyl pentafluorophenyl ether) doped with 30 weight % sodium. This material exhibits paramagnetic properties at the temperature range 5–35 K. At 35–55 K, a sharp increase in measured susceptibility is indicative of the onset of antiferromagnetic coupling. At higher temperatures (60–300 K), the material becomes paramagnetic again.

Figure 33A:
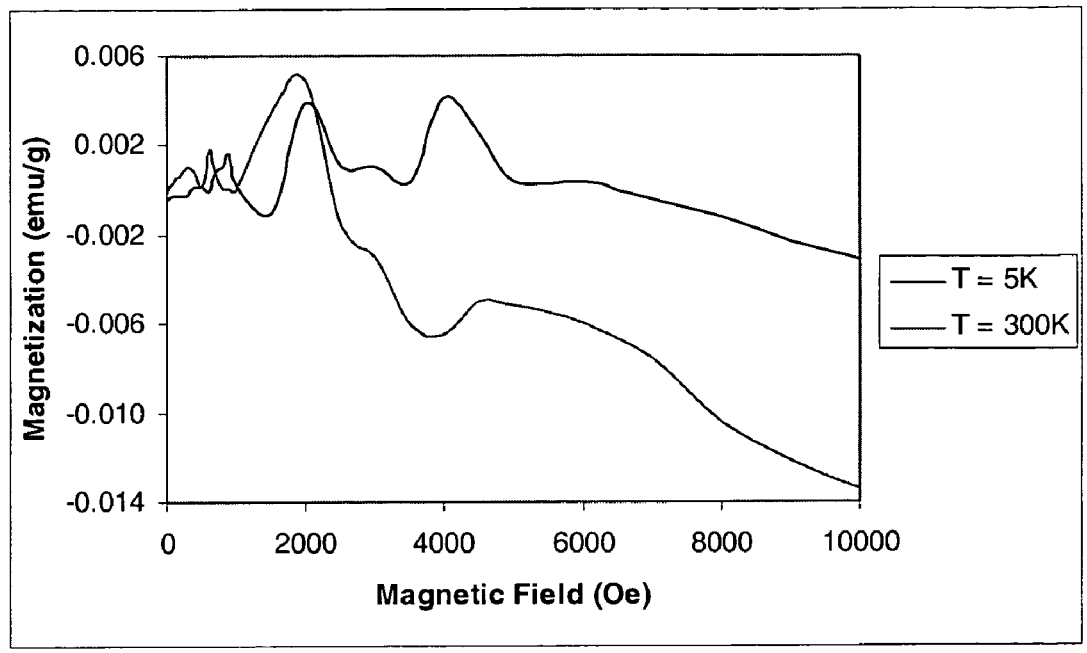
FIGS. 33A and 33B are graphs of the magnetic properties of high MW poly(glycidyl pentafluorophenyl ether) doped with 22 wt % sodium.
Figure 33B:
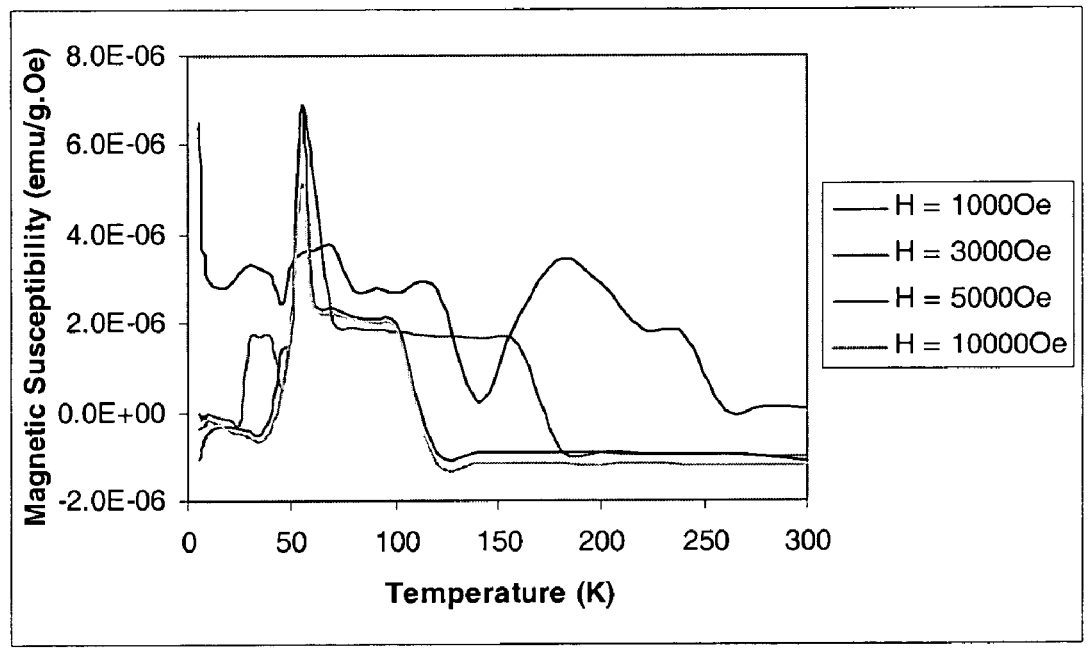
Figure 34A:
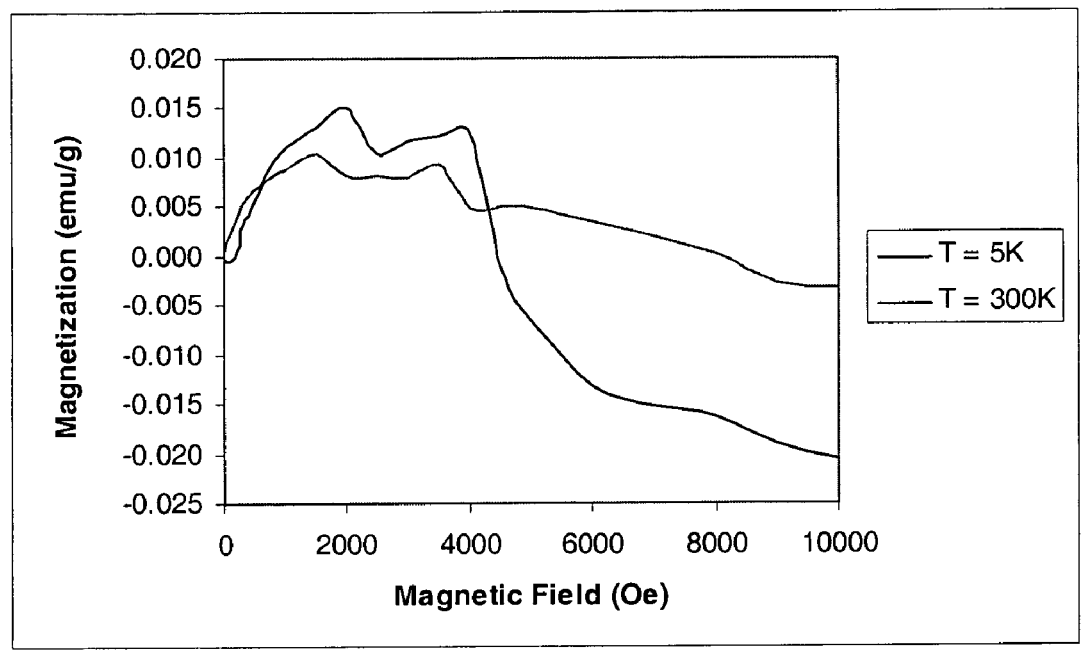
FIGS. 34A and 34B are graph of the magnetic properties of medium MW poly(glycidyl pentafluorophenyl ether) doped with 25 wt % potassium.
Figure 34B:
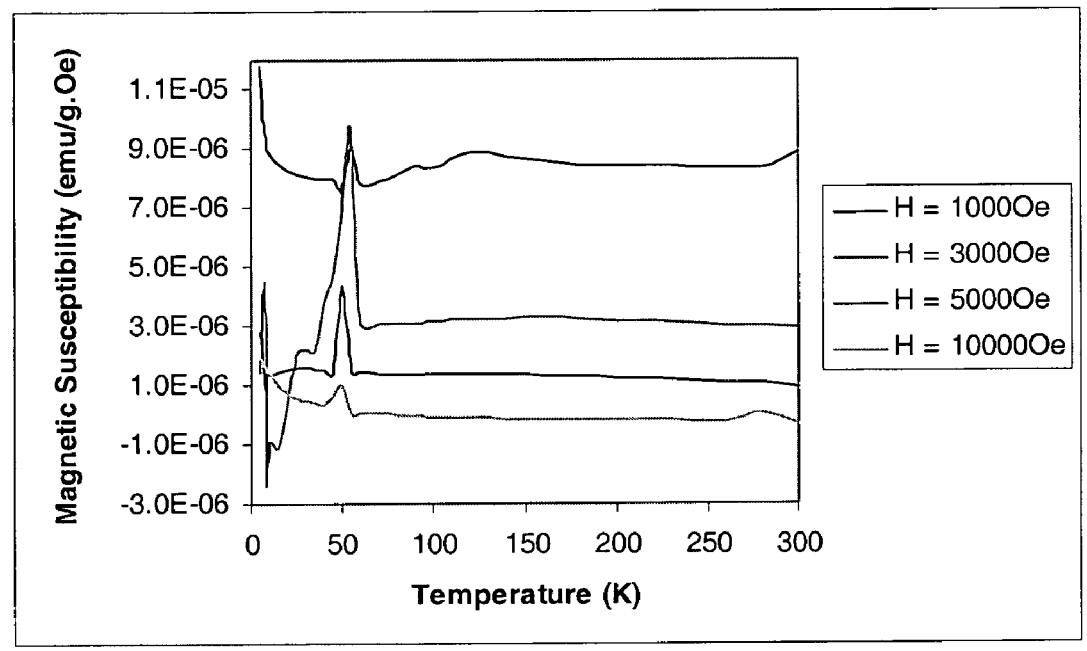
Figure 35A:
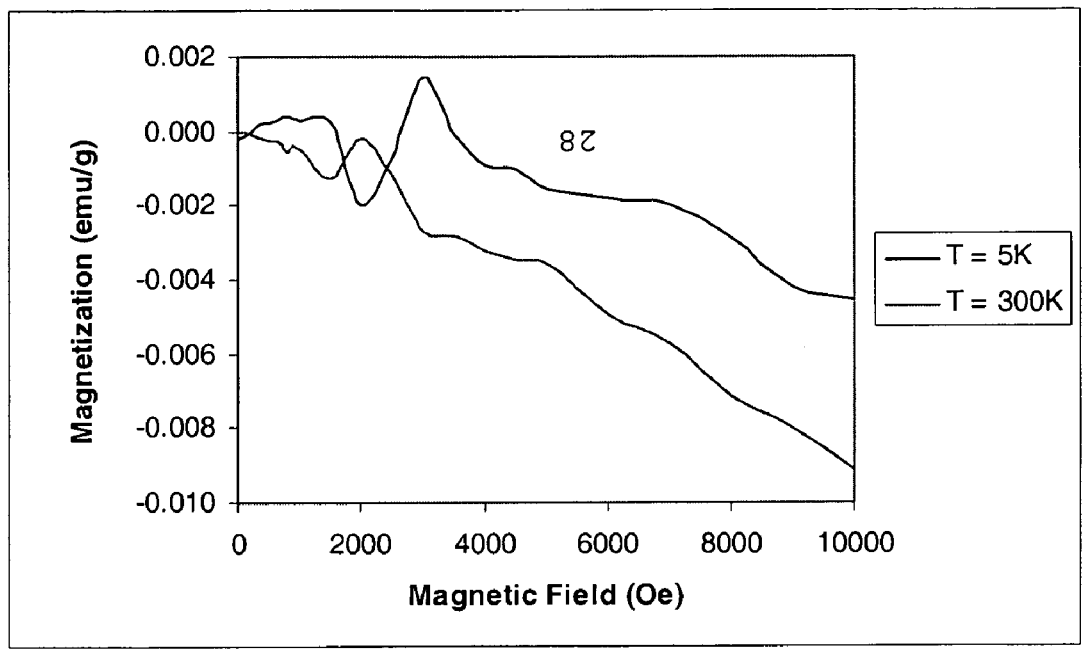
FIGS. 35A and 35B are graphs of the magnetic properties of medium MW poly(glycidyl pentafluorophenyl ether) doped with 35 wt % sodium.
Figure 35B:
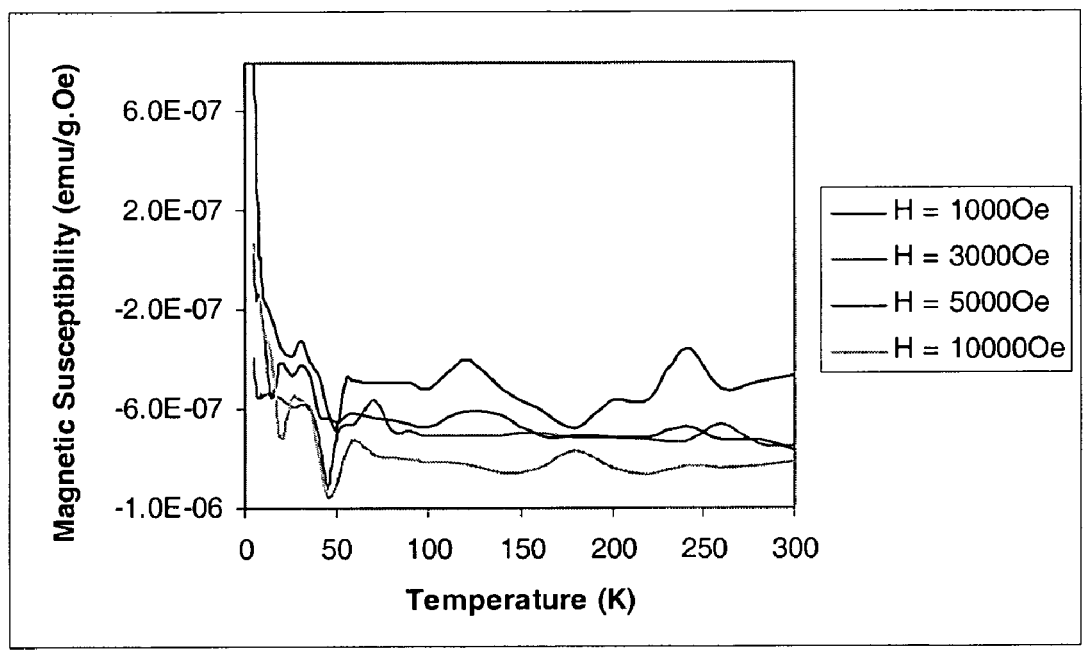

Normally the magnetic moments coupling occurs in some typical regions (called domain) instead of through out the entire material. The material may contain several different domains in which different types of coupling presents. In this case the observed magnetic properties may be complex dir to the overall effect of difference types of magnetic states. The magnetic properties of high MW poly(glycidyl pentafluorophenyl ether) doped with 22 weight % sodium is an example, as shown in FIGS. 33A and 33B.

The temperature at the Neel point was a function of the metal used and the field. Generally, metallation with sodium gave products that displayed Neel point at 35 to 40 degrees higher than materials doped with potassium. Thus metallation with potassium produced softer phases.

FIGS. 34A and 34B, and FIGS. 35A and 35B show the magnetic properties of medium MW (2000–10000) poly (glycidyl pentafluorophenyl ether) doped with 25 wt % potassium and 35 wt % sodium respectively.

Conductivity Measurements

The doped poly(glycidyl pentafluorophenyl ether) was dissolved in THF to get a series of solutions with different concentrations. The dc electrical resistance of these solutions was measured at room temperature. The data are shown in Table 2. The resistance of the doped polymer varies strongly with the length of the polymer chain, the doped high MW polymers show much smaller resistance than the doped oligomers. Difference in the concentration of the THF solutions has a much smaller influence. These measurements indicated that the materials were essentially insulators at room temperature.

TABLE 2

The room-temperature dc electrical resistance of doped poly(glycidyl pentafluorophenyl ether) in THF.

| Material: poly(glycidyl pentafluoropheny ether) doped with alkali materials | Doping level: wt % of metals in the polymer | Resistance (MΩ) |
|---|---|---|
| High MW fraction doped with potassium | 22.5% | 2–4 |
| Oligomers doped with potassium | 20.1% | 10–12 |
| High MW fraction doped with sodium | 22.2% | 5–8 |
| Oligomers doped with sodium | 6.3% | 10–11 |
| High MW fraction doped with lithium and potassium | 25.2% | 0.3–0.4 |
| Oligomers doped with lithium and potassium | 2.6% | 8–9 |

EPR Analysis

Electronic structure is an important concept in chemistry. EPR is a sensitive tool to study molecular structure, order, and dynamics of systems with unpaired electron spins. EPR (Electron Paramagnetic Resonance), often called ESR (Electron Spin Resonance), is a branch of spectroscopy in which electromagnetic radiation is absorbed by molecules, ions, or atoms possessing electrons with unpaired spins, i.e. electronic spin S>0. EPR is similar to NMR (Nuclear Magnetic Resonance) which deals with nonzero nuclear spins, I>0. In both EPR and NMR, the sample material is immersed in a strong static magnetic field and exposed to an orthogonal low-amplitude high-frequency field. ESR usually requires microwave-frequency radiation (GHz), while NMR is observed at low radio frequencies (MHz). The typical mode of EPR signal detection is: microwave frequency is kept constant and magnetic field is varied. There is a characteristic magnetic field where energy is absorbed by the sample when the frequency of the radiation is appropriate to the energy separation between two different electron spin states in the sample.

Most of the materials in a bulk form at normal conditions have net zero electron spin and, thus, are EPR silent, but some can provide an EPR signal. The representative species are: Free radicals (highly reactive molecules which contain a single unpaired electron); Organic-ion radicals (very reactive species which are created along a course of redox reactions); Triplet-state organic molecules and biradicals; Transition-metal and rare-earth species which contain unpaired nd and/or mf electrons (e.g. iron, copper, cobalt).

Paramagnetic centers are created during doping of polymer materials. EPR spectroscopy is unique in the sense that it can specifically probe the paramagnetic molecules. Most paramagnetic metal centers require low (20 K or lower) temperatures for detection.

Figure 13:
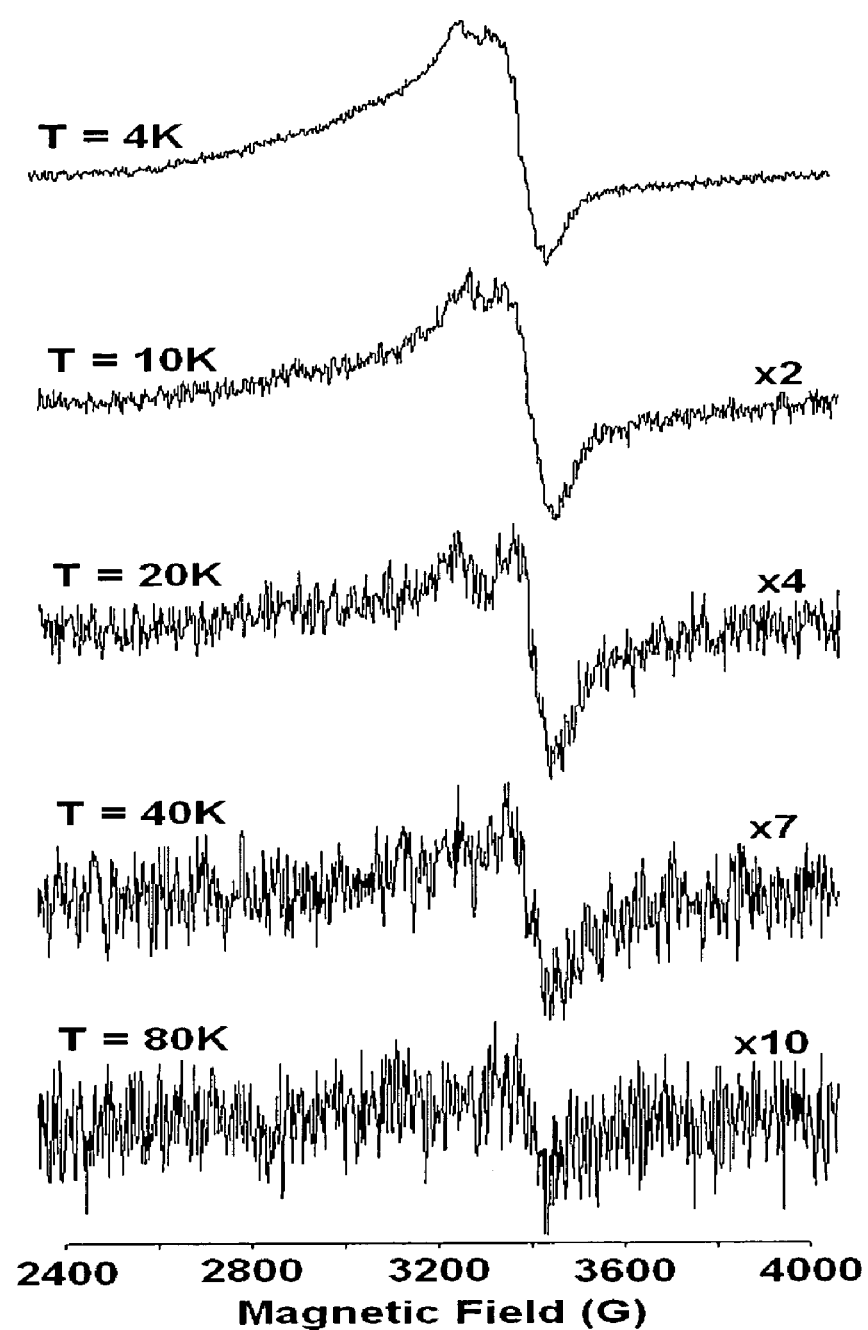
FIG. 13 is a graph showing EPR spectra of metallated polymer 1 (high MW poly(glycidyl pentafluorophenyl ether) doped with 40 wt % potassium). Note Dysonian lineshape at lower temperatures indicative of high conductivity (upper curves). The position of the curves indicate free electron behavior and the presence of more than 1 peak at some temperatures indicate two types of electrons. The peak width indicates that one of the types of electrons is relatively tightly bound as radical anions.
Figure 14:
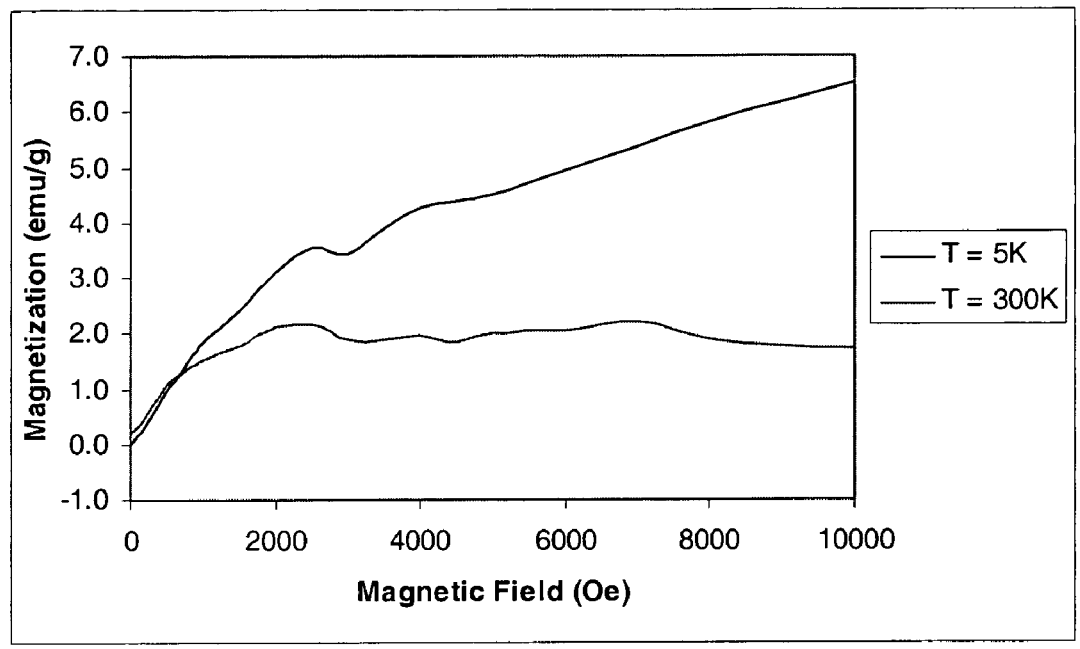
FIG. 14 is a graph showing field dependence of magnetization of polymer 3 doped with 0.5 wt % potassium at 5 and 300 K.
Figure 15:
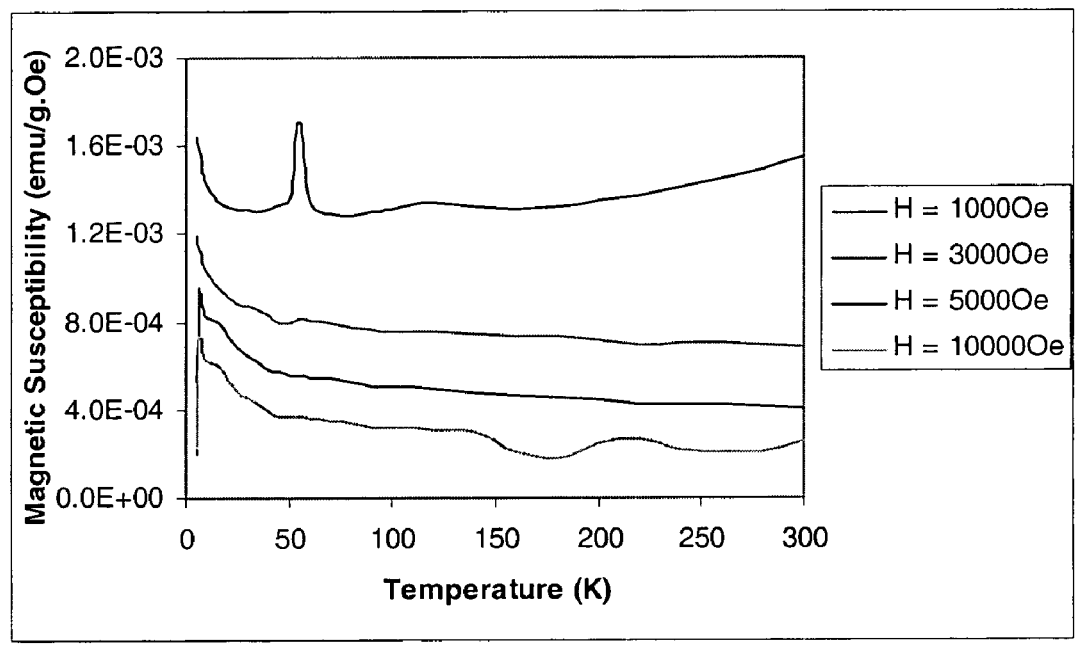
FIG. 15 is a graph showing Temp dependence of magnetization of polymer 3 doped with 0.5 wt % potassium at different fields.
Figure 16:
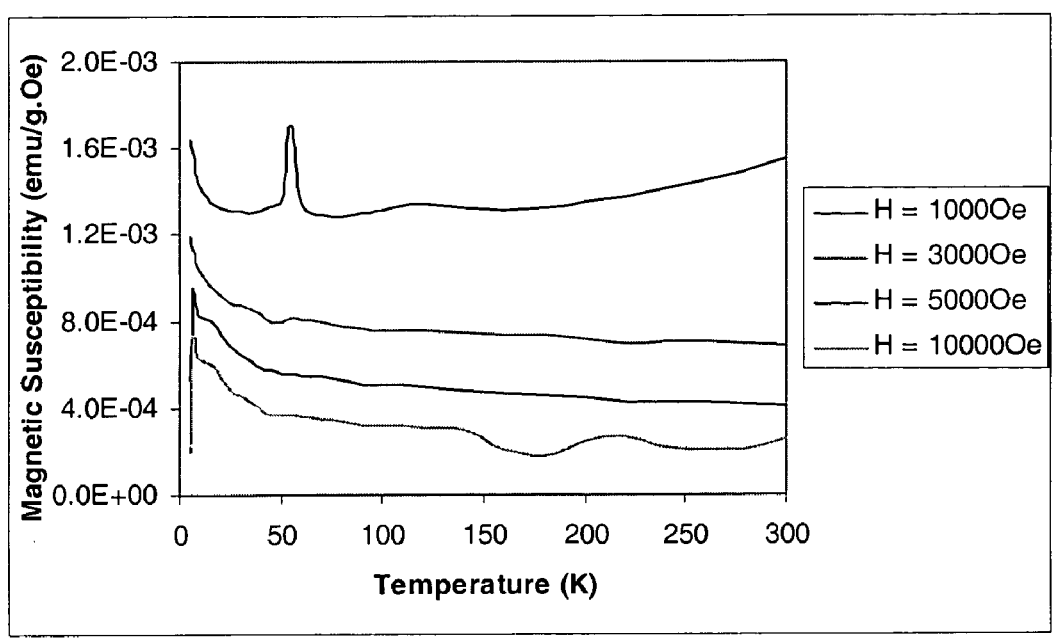
FIG. 16 is a graph showing UV-vis spectra of doped polymers 2 (f) and 3 (g) doped with potassium.
Figure 17:
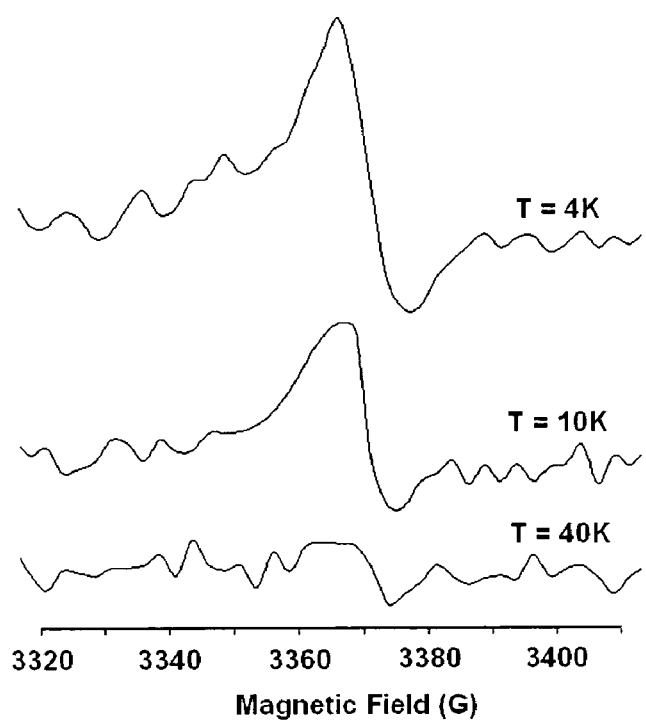
FIG. 17 is a graph showing EPR spectra of polymer 2 doped with 20 wt % potassium at different temperatures.
Figure 18:
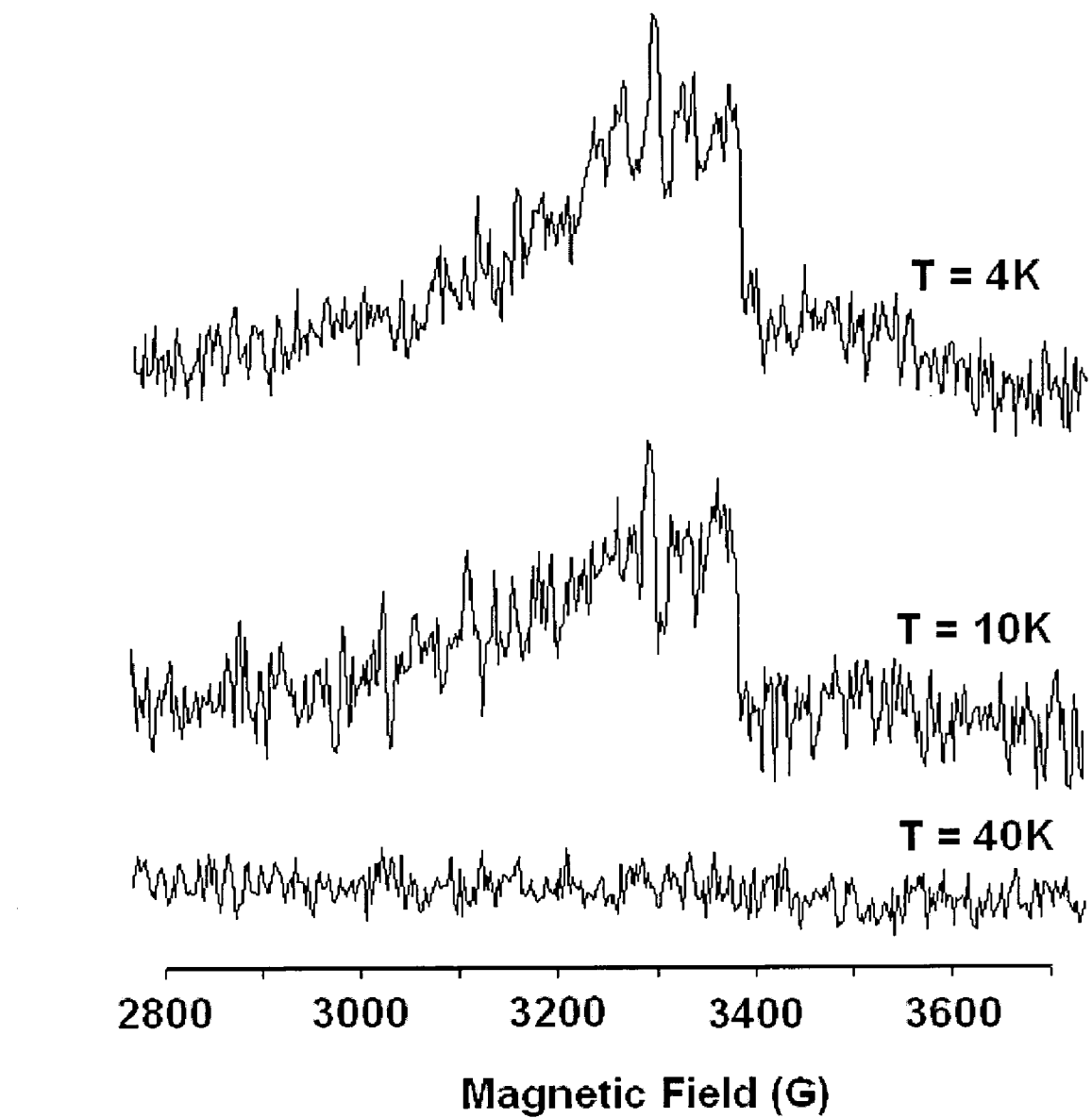
FIG. 18 is a graph showing EPR spectra of polymer 3 doped with 10 wt % potassium at different temperatures.

FIG. 13, shows the temperature dependence of the EPR spectra of high MW(10000–50000) poly(glycidyl pentafluorophenyl ether) doped with 40 wt % potassium. The spectra showed two overlapped signals with hyperfine splittings. The hyperfine structures are due to electrons trapped in the pentafluorophenyl groups and coupled with the fluorine atoms. The signal at lower field is assigned to the pentafluorophenyl radical anions and the signal at higher field is assigned to the itinerant electrons. In the low temperatures region below 20 K, the spectra are Dysonian in shape. The existence of an asymmetry of the EPR spectra characterized by A/B>1 (A and B are the amplitude of the low field and high field peaks respectively of the EPR derivative), is a direct consequence of the high conductivity of the material.[20] At higher temperature (20 K–80 K), the EPR line shape becomes more symmetrical, indicating a decrease of the conductivity. The integrated intensity of the signal decreases with increasing temperature over a wide range from 4 K to 100 K and this change of EPR intensity was found to be reversible against the temperature.

The polymers of the present invention can be charged with electrons in various ways including (1) electrochemical where the polymer is the anode, (2) alkalides which are reacting oxide to release electrons, (3) electrides which release electrons when oxidized, (4) by photolysis where electrons are released from a source by light, and (5) by capture of electrons from a β-emitting radioisotope such as carbon.

It is intended that the foregoing description be only illustrative of the present invention and that the present invention be limited only by the hereinafter appended claims.

We claim:

1. A polyether polymer which comprises:
   (a) a backbone of the polyether polymer having repeating chain units of the backbone;
   (b) electron stabilizing side chains attached at a carbon along the length of the backbone of the polyether polymer, the electron stabilizing side chains comprising an aromatic group covalently attached to the backbone of the polymer and one or more electron withdrawing groups covalently attached to the aromatic group.

2. The polyether polymer of claim 1 wherein the one or more electron withdrawing groups are selected from at least one member of the group consisting of cyano, fluoro, nitro, acyloxy, carboxyalkyl, carboxyaryl, formyl, thiocarbonyl, sulfonyl, alkylsulfoxy (RSO), arylsulfoxy, alkylsulfodioxy, and arylsulfodioxy.

3. The polyether polymer of claim 1 wherein the electron stabilizing side chains occur at an average interval of one electron stabilizing side chain per ten chain units of the backbone to one electron stabilizing side chain per one chain unit of the backbone.

4. The polyether polymer of claim 1 or 2 wherein the electron stabilizing side chains occur at an average interval of one electron stabilizing side chain per six chain units of the backbone.

5. The polyether polymer of claim 1 wherein the backbone of the polymer is a poly(glycidyl ether).

6. The polyether polymer of claim 1 wherein the backbone of the polymer is a poly(glycol ether).

7. The polyether polymer of any one of claims 1, 5 or 6 wherein the electron stabilizing side chains are fluorophenoxy groups containing 1 to 5 fluoro atoms.

8. The polyether polymer of claim 1, 5 or 6 wherein the electron stabilizing side chains are dinitrophenoxymethyl groups.

9. The polyether polymer of claim 1, 5 or 6 wherein the electron stabilizing side chains are dicyanophenoxymethyl groups.

10. The polyether polymer of claim 1 wherein the electron stabilizing side chains are pentafluoromethoxy methyl groups.

11. The polyether polymer of claim 1 wherein the electron stabilizing side chains are dinitrophenoxy methyl groups.

12. The polyether polymer of claim 1 wherein the backbone of the polymer is a poly(pentaethylene glycol).

13. The polyether polymer of any one of claims 1, 6 or 12 wherein the electron stabilizing side chains are fluorobenzyloxymethyl groups containing 1 to 5 fluoro atoms.

14. The polyether polymer of any one of claims 1, 6 or 12 wherein the electron stabilizing side chains are dinitrobenzyloxymethyl groups.

15. The polyether polymer of any one of claims 1, 6 or 12 wherein the electron stabilizing side chains are dicyanobenzyloxy methyl groups.

16. (2,2-dimethyl-1,3-dioxolone-4-methanol)pentafluorophenyl ether.

17. The polyether polymer of any one of claims 1, 2 or 3 wherein the polymer contains stable, free electrons on the electron withdrawing groups so that the polyether polymer is electronegative.

* * * * *

UNITED STATES PATENT AND TRADEMARK OFFICE
CERTIFICATE OF CORRECTION

PATENT NO. : 7,115,706 B2 Page 1 of 1
APPLICATION NO. : 10/802635
DATED : October 3, 2006
INVENTOR(S) : Rawle I. Hollingsworth and Yuqing Chen It is certified that error appears in the above-identified patent and that said Letters Patent is hereby corrected as shown below:

Column 6, line 24, "a graph slowing field" should be --a graph showing field--.

Column 10, line 46, "and a spectrumn of" should be --and a spectrum--.

Column 13, line 2, " (80°c) " should be -- (80°C) --.

Column 17, line 54, "pentaetylene" should be -- pentaethylene--.

Column 18, line 53, "hydride 1.0/1.0/3.0" should be --hydride = 1.0/1.0/3.0--.

Column 21, line 59, "one would except the temperature" should be --one would expect the temperature--.

Column 22, line 55, "dir to the overall" should be --due to the overall--.

Signed and Sealed this

First Day of May, 2007

JON W. DUDAS
*Director of the United States Patent and Trademark Office*